(12) United States Patent
Suttin et al.

(10) Patent No.: US 12,048,599 B2
(45) Date of Patent: Jul. 30, 2024

(54) SCANNABLE HEALING COMPONENTS

(71) Applicant: BIOMET 3I, LLC, Palm Beach Gardens, FL (US)

(72) Inventors: Zachary B. Suttin, Jupiter, FL (US); Alexander Chelminski, Jupiter, FL (US); Miguel G Montero, Boynton Beach, FL (US)

(73) Assignee: BIOMET 3I, LLC, Palm Beach Gardens, FL (US)

( * ) Notice: Subject to any disclaimer, the term of this patent is extended or adjusted under 35 U.S.C. 154(b) by 253 days.

(21) Appl. No.: 16/886,445

(22) Filed: May 28, 2020

(65) Prior Publication Data

US 2020/0375705 A1 Dec. 3, 2020

Related U.S. Application Data

(60) Provisional application No. 62/853,652, filed on May 28, 2019.

(51) Int. Cl.
*A61C 13/00* (2006.01)
*A61C 8/00* (2006.01)
*A61C 9/00* (2006.01)

(52) U.S. Cl.
CPC .......... *A61C 13/0004* (2013.01); *A61C 8/008* (2013.01); *A61C 9/0053* (2013.01)

(58) Field of Classification Search
CPC ... A61C 13/0004; A61C 8/008; A61C 8/0001; A61C 9/0053
See application file for complete search history.

(56) References Cited

U.S. PATENT DOCUMENTS

| | | | | |
|---|---|---|---|---|
| 7,988,449 B2* | 8/2011 | Amber | ............... | A61C 13/0004 433/213 |
| 8,932,058 B2* | 1/2015 | Fisker | ................... | A61C 19/04 433/173 |
| 9,668,834 B2* | 6/2017 | Suttin | .................. | A61C 8/0001 |
| 2014/0302458 A1* | 10/2014 | Towse | ................ | A61C 13/0004 703/1 |
| 2015/0173862 A1 | 6/2015 | Suttin et al. | | |
| 2015/0173870 A1* | 6/2015 | Suttin | ................ | A61C 13/0004 433/202.1 |

(Continued)

FOREIGN PATENT DOCUMENTS

| | | |
|---|---|---|
| JP | 2018-538014 A | 12/2018 |
| WO | 2015030281 | 3/2015 |

(Continued)

OTHER PUBLICATIONS

Vafiadis, D. "Computer-Generated Abutments Using A Coded Healing Abutment: A Two-Year Preliminary Report" Pract. Proced. Aesthetic Dent., vol. 19, issue 7, pp. 443-448 (2007) (Year: 2007).*

(Continued)

*Primary Examiner* — Jay Hann
(74) *Attorney, Agent, or Firm* — Sheridan Ross P.C.

(57) ABSTRACT

A sealing abutment can include scannable features and can be coupled to a dental implant via a retention screw. The healing abutment can include features that can be scanned by an intra-oral scanning system or transferred to a physical impression to convey information regarding the position and orientation of the dental implant.

26 Claims, 12 Drawing Sheets

(56) References Cited

U.S. PATENT DOCUMENTS

2019/0247149 A1* 8/2019 Simmonds ......... A61C 13/0004

FOREIGN PATENT DOCUMENTS

| WO | 2019160911 | 8/2019 |
| WO | 2020243348 | 12/2020 |

OTHER PUBLICATIONS

Nayyar, N., et al. "Using Digitally Coded Healing Abutments and an Intraoral Scanner to Fabricate Implant-Supported, Cement-Retained Restorations" J. Prosthetic Dentistry, pp. 210-215 (Apr. 2013) (Year: 2013).*

Batak, B., et al. "Effect of coded healing abutment height and position on the trueness of digital intraoral implant scans" J. Prosthetic Dentistry, vol. 123, issue 3, pp. 466-472 (Mar. 2020) (Year: 2020).*

Mizumoto, R. & Yilmaz, B. "Intraoral scan bodies in implant dentistry: A systematic review" J. Prosthetic Dentistry, vol. 120, issue 3, pp. 343-352 (2018) available from <https://www.sciencedirect.com/science/article/pii/S002239131730776X> (Year: 2018).*

"International Application Serial No. PCT US2020 034980, International Search Report mailed Sep. 24, 2020", 4 pgs.

"International Application Serial No. PCT US2020 034980, Written Opinion mailed Sep. 24, 2020", 10 pgs.

"International Application Serial No. PCT US2020 034980, International Preliminary Report on Patentability mailed Dec. 9, 2021", 12 pgs.

Official Action (with English machine translation) for Japan Patent Application No. 2021-570468, dated Jan. 10, 2023 7 pages.

Official Action for European Patent Application No. 20760596.5, dated Aug. 25, 2023 8 pages.

\* cited by examiner

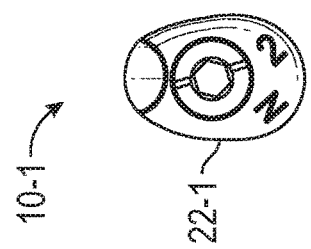
FIG. 12A
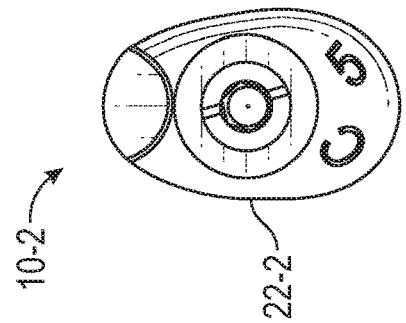
FIG. 13A
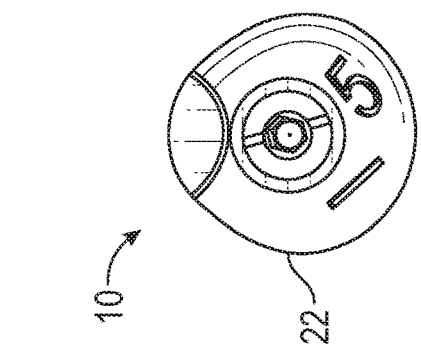
FIG. 14A
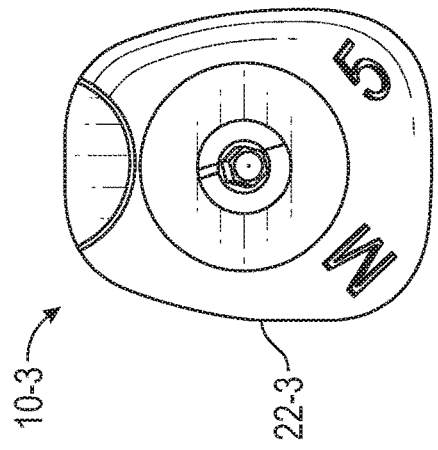
FIG. 15A
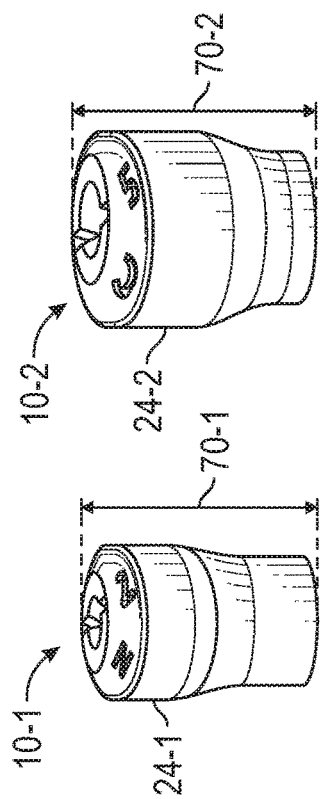
FIG. 12B
FIG. 13B
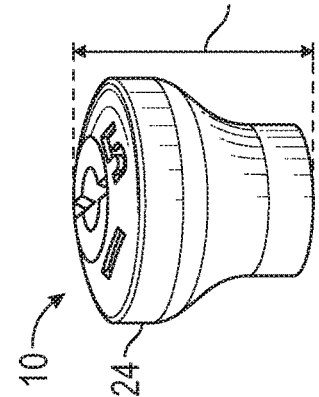
FIG. 14B
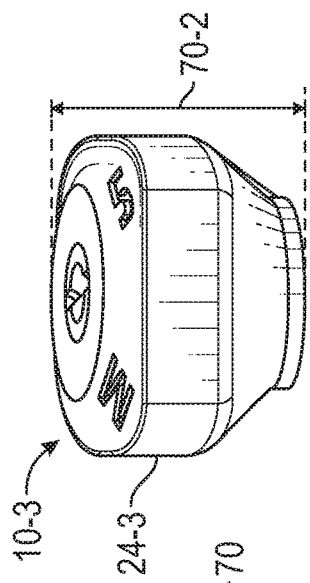
FIG. 15B

SCANNABLE HEALING COMPONENTS

PRIORITY CLAIM

This application claims priority to U.S. Ser. No. 62/853,652, filed on May 28, 2019, entitled "Scannable Healing Components", the disclosure of which is incorporated by reference in its entirety.

TECHNICAL FIELD

This document pertains generally, but not by way of limitation, to dental prosthetic systems and methods, and more specifically, to healing components, such as healing abutments, with scannable features.

BACKGROUND

Dental prosthetic systems can be used to reconstruct defects in a patient's jaw such as missing or misaligned teeth. Dental prosthetic systems can include components such as a dental implant, an intermediary structure such as an abutment, and a final prosthesis or restoration such as a crown, bridge or a denture, which can replicate a patient's missing tooth or teeth.

The placement of the dental implant can be accomplished in stages. For example, in a first stage, a dental practitioner can review radiographs and dental models to determine the proper placement and axial alignment of the dental implant. In a second stage, a dental surgeon can access the bone through the mucosal tissue. The surgeon can drill or bore out the maxillary or mandibular bone. The dental implant can then be pressed or screwed into the bone. A healing abutment, generally having a height at least equal to the thickness of the gingival tissue can be coupled to the dental implant to guide the growth of the gingival tissue during a healing period.

In certain procedures, an impression can be taken after the dental implant is implanted. The impression can be used to record the position and orientation of a top surface (e.g., seating surface) of the dental implant. The position and orientation of the top surface of the implant can then be reproduced in a stone model of the patient's mouth. The main objective of the impression is to properly transfer the size and shape of adjacent teeth and soft tissue in relation to the top surface of the permanently placed dental implant to the dental technician. The stone model provides the laboratory technician with a precise model of the patient's mouth, including the orientation and position of the top surface dental implant relative to the surrounding teeth. Based on this model, the technician can construct a final restoration that will accurately mate with the dental implant positioned in the patient's mouth. To aid in the impression process, an impression coping or device can be coupled to the top surface of the dental implant. In some instances, the healing abutment can be removed and the impression coping is coupled to the dental implant. Removing the healing abutment can disturb healing tissue and if the impression coping doesn't have the same or similar gingival dimensions as the healing abutment a gap can form between the impression coping and the wall of the gum tissue defining the aperture, which can cause a less than accurate impression of the condition of the patient's mouth. The impression coping can leave an impression in the impression material or can be picked up and retained in the impression material. In a final stage of the restorative process, the healing abutment can be replaced with the final restoration.

More recently, intra-oral scanning (IOS) has emerged as an alternative to taking a physical impression and/or creating a stone model of the patient's mouth. In such procedures, a handheld intra-oral scanner can be used to capture three-dimensional data and/or images of the shape of adjacent teeth in relation to the permanently placed implant and/or the configuration and orientation of the dental implant through the use of a scan body, which can be coupled to the top of the dental implant. This information can be used to construct a physical or digital model of the patient's anatomy which can be used to design and/or fabricate a final restoration.

OVERVIEW

The present inventors have recognized, among other things, that previous healing abutments can have certain disadvantages. For example, complicated code systems on the top of healing abutments can be difficult to manufacture and can be difficult to accurately capture with a scan, which can reduce the accuracy in which the codes are interpreted. Additionally, some previous healing abutments have a non-anatomic shape such that the gingiva heals in a shape that may not correspond to the final prosthesis shape. Regarding complex codes, previous approaches have used a variety of ways to transfer information about the healing abutment in the scan data. For example, plurality of projections, grooves, and non-symmetrical shapes that have features that can be calculated, can be used in determining information about the healing abutment and the implant. However, in order to accurately determine the position and orientation of the implant, the scan quality is important such that all of the codes are picked up. Since the quality of the scan data can affect the accuracy of locating the position and orientation of the implant, when complex codes are used the difficulty in obtaining an accurate position and orientation of the implant from the scan data can increase. Further, when complex codes are used, manufacturing can become difficult and inaccuracies between the actual healing abutment and the design file (virtual healing abutment) can increase. Moreover, the complex codes can increase difficulty during data manipulation, e.g., interpretation and alignment such as, for example, shape-matching.

The present inventors have provided a solution by providing a healing abutment or scan body (in the following description, healing abutment can also refer to a healing element, healing cap, or scan body) for coupling to a dental component that includes scannable features (also referred to herein as "informational markers") that can be used to accurately determine the position and orientation of a dental implant. The scannable features are less complex thus manufacturing ease is increased, which can increase the accuracy between the manufactured healing abutment and the design file (virtual healing abutment). The data acquisition is increased because the quality of the healing abutment scan is more accurate and higher quality because of the less complex scannable features. Further, the data manipulation ease and accuracy can increase because of the less complex codes, thereby, increasing the accuracy of the alignment of the virtual healing abutment with the scan data of the healing abutment.

As used herein, "scannable features" (also referred to herein as "informational markers") can include any reference part/surface of the healing abutment (attachment member) that can be picked-up in scan data and used to identify unique characteristics of the healing abutment, which assist a user in determining the position and orientation of an underlying implant. For example, "scannable features" can include the shape of a surface of the healing abutment, indicia (including distinguishing marks including, but not limited to, text, color, and numbers, etc.), grooves, protrusions, flats, and shapes that can be used for or as, among other things, shape matching, aligning, and reference surfaces. That is, the overall surface defining the shape of the healing abutment as well as any distinguishing marks, surface lines, profile or cross-sectional shapes, etc., can be a scannable feature, as discussed herein.

A plurality of information can be provided in the scan data, e.g., via the informational markers. However, the present inventors have determined that certain data needs to be more accurate than other data. For example, information from some scannable features (also referred to as "first informational markers," "hard codes," or "first scannable features") that are used to determine the location and orientation of the dental implant are important when designing a final prosthesis and the information needs to be as accurate as possible. However, in contrast, other scannable features (referred to herein as "second informational markers," "soft codes," or "second codes,") that are used to determine information such as the profile of the soft tissue or the implant connection type does not need to be as accurate. For example, the soft tissue is pliable and moveable such that determining the exact shape of the soft tissue in the 3D model is not as important as determining the location and orientation of the dental implant. Thus, the present invention has minimized the complexity of the informational markers or scannable features such that the informational markers used to determine the location and orientation of the dental implant are located on the healing abutments of the present disclosure and can be used to accurately determine the location and orientation of the dental implant.

When a user receives scan data including scan data of a healing abutment in a patient's mouth, they can create a three-dimensional (3D) virtual model of the scan data including a portion of the healing abutment. The user can subsequently manipulate the data by combining a virtual healing abutment with the 3D virtual model. As discussed herein, once the virtual healing abutment is accurately placed within the 3D virtual model of the scan data, the virtual healing abutment can be removed from the 3D model such that the position and orientation of a top seating surface of the dental implant is known.

When scanning techniques are used to capture the scannable features of a healing abutment, computer software is able to determine the position and orientation of the implant relative to the adjacent teeth. For example, the position of the implant is defined in a Cartesian coordinate system having "X," "Y," and "Z" axes. The common point is at the intersection of the centerline of the implant and a plane representing the seating surface of the implant.

In one example, the first scannable features can be shaped matched to a corresponding first scannable features of a virtual healing abutment (the design file). Since the dimensions of the virtual healing abutment are known, the 3D virtual model can be modified. In order to properly align the virtual healing abutment within the 3D virtual model and determine a coordinate system, a reference surface is determined. The present inventors have determined that certain scannable features are more important than others for determining the reference surface. Thus, the first scannable features can be used for shape-matching such that the location and orientation of the reference surfaces are accurately determined within the 3D virtual model. That is, the first scannable features are used to shape-match to corresponding features on the virtual healing abutment. Once they are shape-matched, the first scannable features of the virtual healing abutment are locked into a coordinate system in five of the six degrees of freedom. As discussed more herein, since the location of the seating surface is beneath the healing abutment, shape-matching the first scannable features doesn't provide the location along the Z-axis of the seating surface.

At least one second scannable feature can provide various information of characteristics of the healing abutment. For example, a height dimension of the healing abutment can be indicated from the second scannable features. Once the height dimension is known, the virtual healing abutment is locked in the sixth degrees of freedom and the exact location and orientation of a portion of the dental implant is known within the coordinate system. Additionally, the data from the at least one second scannable feature can be used can be used to determine additional information about the healing abutment, e.g., profile shape and implant connection type.

In an example, a healing abutment can include a body extending from a coronal end portion to an apical end portion. The body can include a side surface and a top surface defining an edge, where the top surface includes a coronal-most surface and a circumferential portion extending between the top surface and the edge. A portion of the circumferential portion can taper from the coronal-most surface toward the edge. The side and/or top surface can further include indicia. However, as discussed herein, the coronal-most surface and the circumferential portion are used for shape matching to accurately position the virtual healing abutment within the 3D virtual model of the patient.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

FIG. 12A illustrates a top view of a healing abutment, according to one exemplary embodiment.

FIG. 12B illustrates a perspective view of the healing abutment in FIG. 12A.

FIG. 13A illustrates a top view of a healing abutment, according to one exemplary embodiment.

FIG. 13B illustrates a perspective view of the healing abutment in FIG. 13A.

FIG. 14A illustrates a top view of a healing abutment, according to one exemplary embodiment.

FIG. 14B illustrates a perspective view of the healing abutment in FIG. 14A.

FIG. 15A illustrates a top view of a healing abutment, according to one exemplary embodiment.

FIG. 15B illustrates a perspective view of the healing abutment in FIG. 15A.

Figure 1:
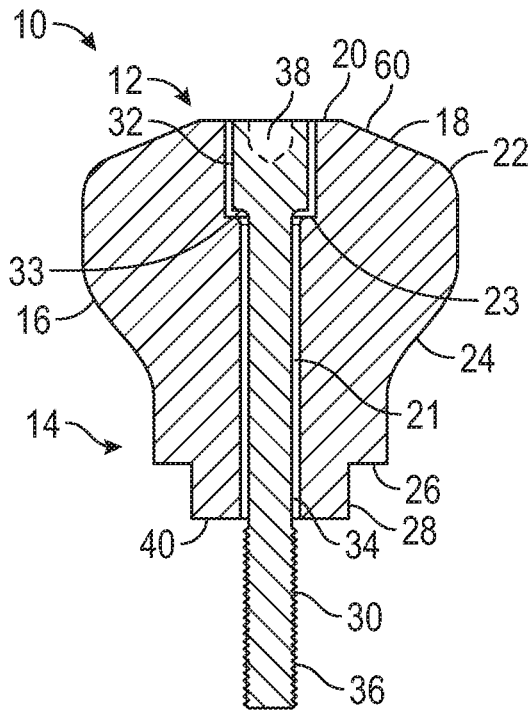
FIG. 1 is a cross-sectional view of a healing abutment and retention screw, according to one exemplary embodiment.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Embodiments of a healing abutment and methods will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications, combinations and sub-combinations and/or equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "proximal," "distal," "apical" "front," "back," "coronal" "rear," and "side" describe the orientation and/or location of portions of the components or elements within a consistent but arbitrary frame of reference which is made clear by reference to the text and the associated drawings describing the components or elements under discussion. Such terminology may include the words specifically mentioned above, derivatives thereof, and words of similar import.

FIGS. 1, 2, and 8A-C illustrate a healing abutment 10 that can be coupled to a dental implant 42 (see FIGS. 2A and 2B) via a retention screw 30. In one embodiment, the dental implant 42 can be a "bone level" dental implant as described below. In modified arrangements the healing abutment 10 can be coupled directly to the dental implant 42 or to one or more intermediate components between the dental implant 42 and the healing abutment 10.

Figure 3:
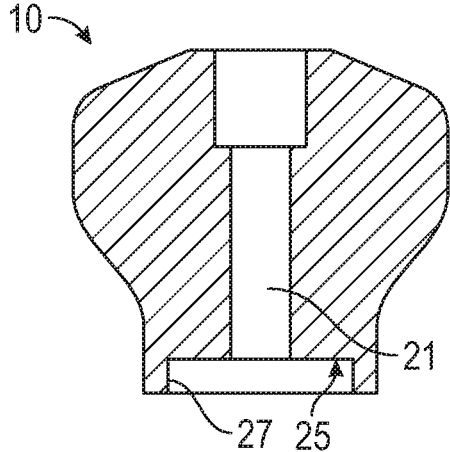
FIG. 3 is a cross-sectional view of a healing abutment, according to one exemplary embodiment.

The healing abutment 10 includes a body 16 extending from a coronal end portion 12 to an apical end portion 14. The apical end portion 14 can include a seating surface 26 configured to contact a top surface 44 of the implant 42. The apical end portion 14 can also include a non-rotational feature 28 that can be received within a corresponding bore 46 of the implant 42. The bore 46 of the implant 42 having a non-rotational feature 48 that corresponds to the non-rotational feature 28 of the healing abutment 10. While shown as a projection in FIG. 1, FIG. 3 illustrates an example where the non-rotational feature 27 is a non-rotational cavity 25 that can receive a non-rotational feature extending from a top surface of an implant. Other non-rotational features to prevent rotation between the healing abutment 10 and the implant 42 are contemplated. The apical end portion 14 can include a stop surface 40 at the apical end of the non-rotational feature 28 that can contact a top surface 44 on the implant 42 when the healing abutment 10 is coupled to the implant 42.

The healing abutment 10 includes a bore 21 extending through the abutment and includes a shoulder 23 configured to engage a shoulder 33 of a head 32 of the retention screw 30. As seen in FIG. 1, the retention screw 30 includes threads 36 that can engage with threads 54 of a bore 51 in the implant 42 to secure the healing abutment 10 to the dental implant 42. The retention screw 30 also includes a bore 38 that receives a tool to rotate the screw 30.

The healing abutment 10 includes a side surface 24 and a top surface 18 defining an edge 22. That is, the edge 22 is positioned between the side surface 24 and the top surface 18. In other words, the edge 22 defines a boundary between the side surface 24 and the top surface 18 and extends continuously about a circumference of the top surface 18. As discussed herein, the perimeter defined by the edge 22 can define an asymmetrical shape (see FIG. 8A). In one example, the perimeter defined by the edge 22 can be circular. While the edge 22 can be circular, generally, asymmetrical shapes can be closer to the natural shape of a patient's tooth being replaced as compared to a cylinder. However, both circular and asymmetrical shapes defined by the perimeter of the edge 22 are contemplated. Thus, the edge 22 can have a variety of shapes corresponding to different teeth being replaced.

In one example, the side surface 24 can include an emergence profile that can assist shaping the healing gingival tissue. For example, the side surface 24 can include one or more curved surfaces to assist forming the gingiva. Additionally, the outer surface 24 can include straight portions that are inclined in relation to each other. Other configurations are possible in modified embodiments. Therefore, the shape of the edge 22 and the side surface 24 can help shape the gingiva into a desired shape. The cross-sectional shape of the healing abutment 10 below the edge 22 can also be asymmetrical or symmetrical and can have a similar or different shape 22 as compared to the edge 22.

In one example, the top surface 18 includes a coronal-most surface 20. In one example, the coronal-most surface 20 is planar and perpendicular to a longitudinal axis 19 (see FIGS. 8A-C) of the healing abutment 10. The coronal-most surface 20 can include an inner edge 29 and an outer edge 31 as the coronal-most surface 20 can encircle the bore 30. The thickness 72 of the coronal-most portion 20 between the inner and outer edge 29, 31 can vary and be based on a variety of factors. As discussed herein, the coronal-most portion 20 can be planar and is a scannable feature that provides information about the dental implant. In one example, the coronal-most portion 20 is perpendicular to the longitudinal axis 19. In another example, the coronal-most portion 20 is not perpendicular and forms an angle other than 90 degrees relative to the longitudinal axis 19. Additionally, in some examples, the coronal-most surface 20 is not planar.

In an example, the top surface 18 includes a circumferential portion 60 that extends between the coronal-most surface 20 and the edge 22. As discussed herein, the circumferential portion 60 is a portion of the top surface 18 that forms at least a portion of a cone such that the scan data of the circumferential portion 60 can be shaped-matched to the virtual healing abutment having the same circumferential portion 60. Because a central axis of the circumferential portion 60 (having a conical shape or portion matching a portion of a conical shape) is known, the orientation of the central axis of the healing abutment in the 3D virtual model is also known, as discussed more herein.

In one example, the circumferential portion 60 tapers away from the coronal-most surface 20. As discussed herein, the circumferential portion 60 defines at least a portion of a cone. That is, along the circumferential portion 60, a portion of the top surface 18 extends circumferentially having a constant radius of curvature along a plane perpendicular to the longitudinal axis and extends radially having a constant taper angle. While the circumferential portion 60 is discussed as having a conical-shape, any axis-symmetric geometry can be used such that a central axis can be determined, or is known, from the circumferential portion 60. While a cone-shape is easy to manufacture, it is contemplated that any shape/scannable feature can be used such that the central axis can be determined can be used.

In an example, during use, the first scannable features or first informational markers, i.e., the coronal-most portion 20 and the circumferential portion 60, are provided in the scan data and a 3D model of the scan data is generated. The first informational markers can be used as reference surface to determine the location and orientation of a virtual dental implant in the 3D model, which corresponds to a location and orientation of the dental implant installed in the patient's mouth. The scan data can include healing abutment data, soft tissue data, and surrounding teeth data, if any surrounding teeth are present in the patient.

In one example, the at least one second informational maker or markers can be used to identify the correct virtual healing abutment from a library of virtual healing abutments. The library of virtual healing abutments includes characteristics for each of the virtual healing abutments in the library. Thus, once the correct virtual healing abutment is identified, e.g., by the second informational marker, the information about various characteristics such as dimensional information (height and width), profile and cross-sectional shapes, and a dental implant connection type can be determined. This type of information does not need to be provided in the first informational markers that are used for shape matching. Thus, the second informational markers are separate from the first informational markers. In fact, the second informational markers do not have to be provided in the scan data but can be provided as a note within the file sent with the scan data. This allows the first informational markers that are used as reference surfaces that help determine the location and orientation of the dental implant to be simple and separate from other informational markers. This allows the manufacturing of the healing abutments to be easier, the scanning to be more accurate, and the interpretation and use of the informational markers to be more accurate and less complex leading to an overall improved process and more accurate data.

Once the virtual healing abutment that matches the healing abutment in the scan data is identified, the selected virtual healing abutment can be shaped matched with the 3D model such that the first scannable features in the 3D model align with the virtual first scannable features of the virtual healing abutment. For example, a virtual coronal-most portion of the virtual healing abutment aligns with the coronal-most surface 20 of the healing abutment in the 3D model of the patient's mouth and a virtual circumferential portion is aligned with the circumferential portion 60 of the healing abutment in the 3D model of the patient's mouth. Once shape matched, the virtual healing abutment is merged with the 3D model of the patient's mouth. At that point, a coordinate system has been determined within the 3D model of the patient's mouth. That is, the coronal-most surface and the circumferential portion are fixed in five degrees of freedom and the first informational markers are locked translationally along the X-axis and the Y-axis and rotationally locked along the X-axis, the Y-axis, and the Z-axis. At this point, the only information about the coordinate system, is where along the Z-axis the seating surface is located.

Since the height of the selected virtual healing abutment is known by the second informational marker, by shape matching the coronal-most surface 20 in the 3D model to the virtual coronal-most surface of the virtual healing abutment, the exact location of the seating surface of the dental implant is known. For example, the second informational marker can provide the height of the virtual healing abutment, thus, based on the location of the coronal-most surface 20 the final degree of freedom can be determined and the exact location and orientation of at least the seating surface of the dental implant is known. That is, the seating surface is now locked transitionally along the Z-axis completing the coordinate system and the location and orientation of the seating surface within the coordinate system is determined. As discussed more herein, location and orientation of the seating surface can be the determined coordinate system within the 3D model and/or can include a virtual representation of a seating surface of the virtual dental implant.

FIGS. 4-7 illustrate various cross-sectional shapes of the top surface 18 of the healing abutment 10. As discussed herein, one scannable feature of the healing abutment 10 can be the circumferential portion 60 of the top surface 18 defining a portion of a cone. In one example, the entire top surface 18 extending between the coronal-most surface 20 and the edge 22 can have a cone shape. However, other configurations are possible such that the circumferential portion 60 extends less than 360 degrees around a longitudinal axis and extends less than the entire length between the coronal-most surface 20 and the edge 22. While the edge 22 is shown as an intersection between the top surface and the side surface, the edge 22 can be a rounded corner as shown in, e.g., FIGS. 1 and 8C.

Figure 4:
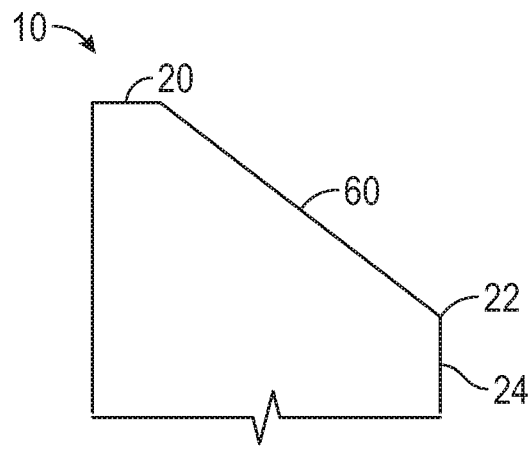
FIG. 4 is a cross-sectional view of a portion of a healing abutment, according to one exemplary embodiment.

Various other exemplary embodiments are shown in FIGS. 4-7. As seen in FIG. 4, the circumferential portion 60 extends from the coronal-most surface 20 to the edge 22. The circumferential portion 60 could extend around the entire top surface, e.g., 360 degrees, or less than 360 degrees, e.g., 180 degrees, 90 degrees, 45 degrees, 25 degrees, etc. For example, machining difficulty and enough surface area to accurately shape match the scan data of the healing abutment 10 to the virtual healing abutment can be factors in determining how much of the top surface forms the circumferential portion 60.

Figure 5:
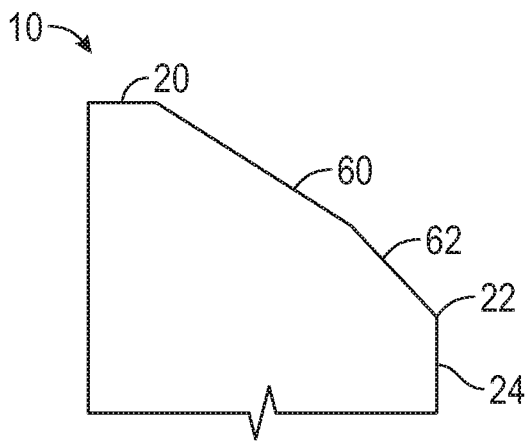
FIG. 5 is a cross-sectional view of a portion of a healing abutment, according to one exemplary embodiment.
Figure 6:
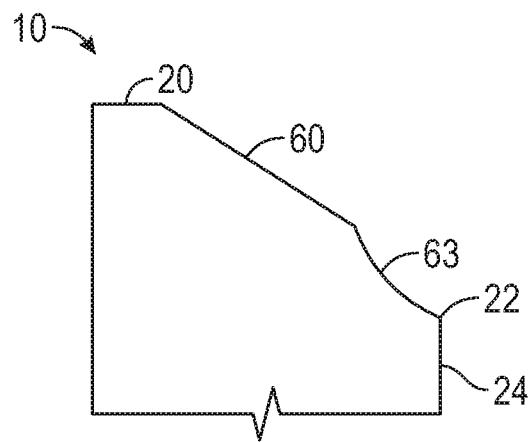
FIG. 6 is a cross-sectional view of a portion of a healing abutment, according to one exemplary embodiment.
Figure 7:
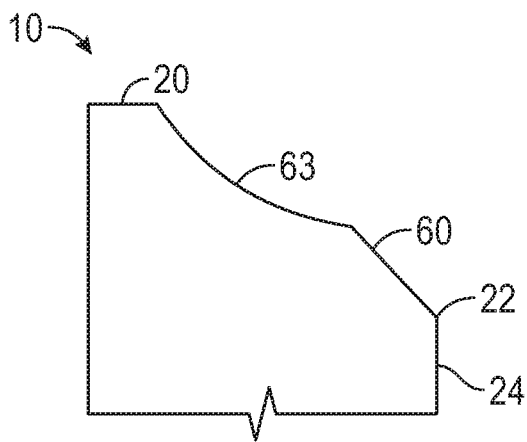
FIG. 7 is a cross-sectional view of a portion of a healing abutment, according to one exemplary embodiment.

Additionally, the circumferential portion 60 can extend 360 degrees for only a portion of the length extending between the coronal-most surface 20 and the edge 22. The extent at which the circumferential portion (having a constant taper angle and a constant radius of curvature along a plane perpendicular to the longitudinal axis) extends around a longitudinal axis of the healing abutment 10 and the length between the coronal-most surface 20 and the edge 20 can vary. Shown in the example of FIG. 5, the circumferential portion 60 extends from the coronal-most portion 20 to another portion 62 of the top surface 18 having a different taper angle compared to the circumferential portion 60. Shown in the example of FIG. 6, the second portion 63 includes a curved surface. While the second portion 63 in FIGS. 5 and 6 are positioned apical to the circumferential portion 60, FIG. 7 illustrates an example where the second portion 63 is positioned coronally to the circumferential portion 60. In one example, the circumferential portion 60 can be positioned between two second portions 63.

FIGS. 8-11 illustrate the healing abutment 10. FIG. 8A illustrates a top view of the healing abutment 10. As can be seen, the perimeter of the edge 22 defines an asymmetrical shape and the coronal-most surface 20 surrounds the bore 21. Again, in one example, the perimeter of the edge 22 can be a circle.

Figure 2A:
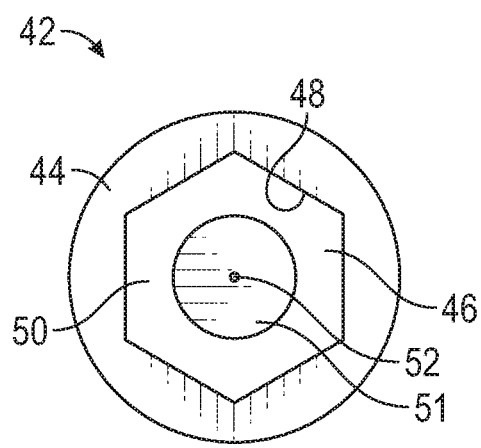
FIG. 2A is a top view of a dental implant, according to one exemplary embodiment.
Figure 2B:
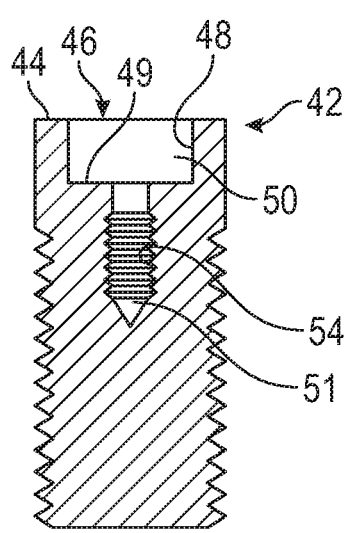
FIG. 2B is a cross-sectional view of the dental implant in FIG. 2A.
Figure 8A:
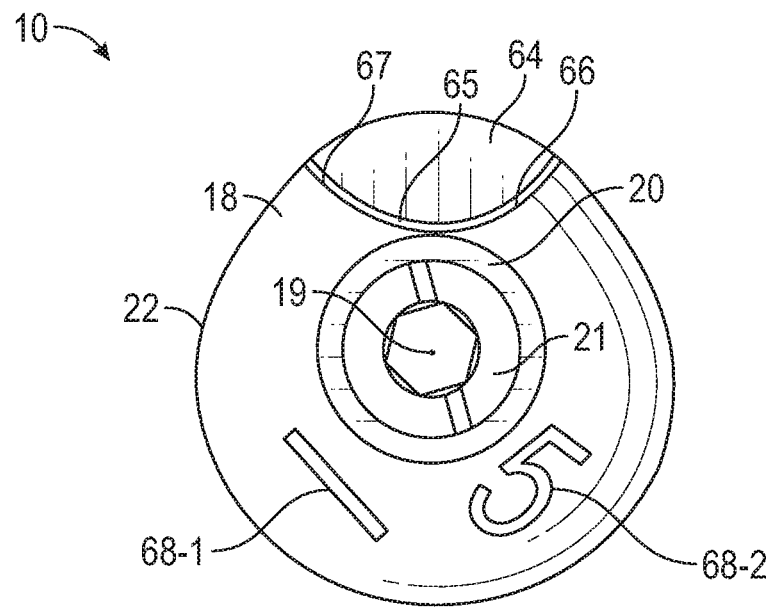
FIG. 8A is a top view of a healing abutment, according to one exemplary embodiment.

In an example, the healing abutment 10 can include a scannable feature indicating the position of a surface of the non-rotational feature 48 of the implant 42 (see FIG. 2A). In one example, the scannable feature can be located on the top surface 18. In another example, the scannable feature can be located on the side surface 24. In the example shown in FIG. 8A, the top surface 18 includes the scannable feature indicating the position of a surface of the non-rotational feature 48 of the implant 42 (see FIG. 2A). For example, if the non-rotational feature is a hexagon, the scannable feature identifying the non-rotational feature can indicate a surface of the hexagon. As shown in the example of FIG. 8A, the scannable feature is a cutout 64 defining a ridge 65. A first side 66 of the ridge 65 and a second side 67 of the ridge 65 extends to the edge 22. However, other configurations are contemplated to identify a non-rotational feature of the implant. For example, the scannable feature of the healing abutment aligns with a non-rotational feature of the healing abutment, e.g., non-rotational feature 28, that mates with a corresponding non-rotational feature 48 of the implant 42.

Figure 9:
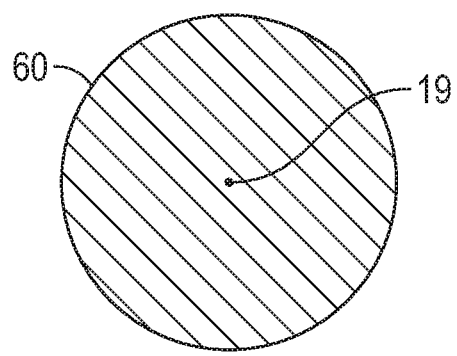
FIG. 9 is a cross-sectional view of the healing abutment in FIG. 8A along a plane perpendicular to the longitudinal axis, according to one exemplary embodiment.
Figure 10:
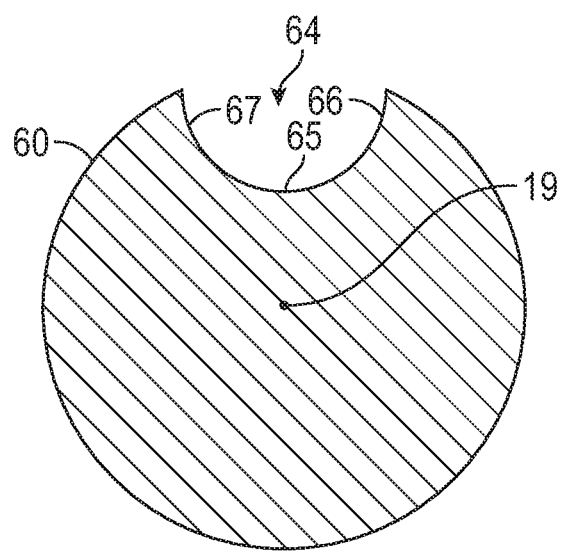
FIG. 10 is a cross-sectional view of the healing abutment in FIG. 8A along a plane perpendicular to the longitudinal axis, according to one exemplary embodiment.
Figure 11:
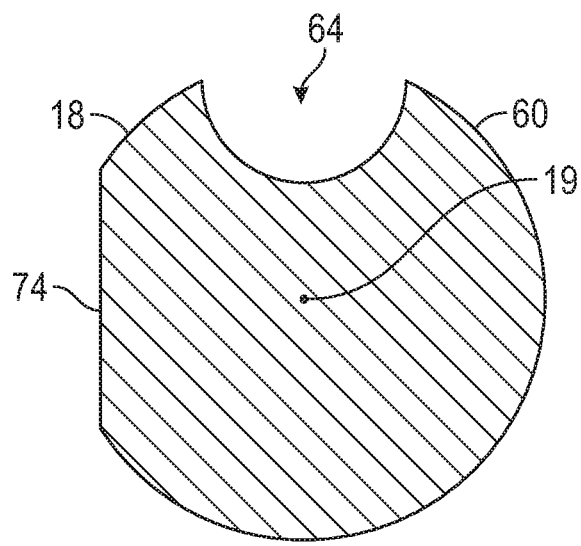
FIG. 11 is a cross-sectional view of the healing abutment along a plane perpendicular to the longitudinal axis, according to one exemplary embodiment.

FIG. 9 illustrates a cross-sectional shape of the healing abutment 10 between the coronal-most surface 20 and the ridge 65. As seen in FIG. 9, the circumferential portion 60 extends 360 degrees around the longitudinal axis 19. FIG. 10 illustrates a cross-sectional shape of the healing abutment along a portion of the cutout 65. As seen in FIG. 10, the circumferential portion 60 extends around the longitudinal axis less than 360 degrees. The circumferential portion 60, as discussed herein, forms a portion of a cone such that a longitudinal axis 19 of the healing abutment can be deduced in the virtual model of the patient's mouth and thus the longitudinal axis of the implant is known. FIG. 11 illustrates another example where the circumferential portion 60 only extends around a portion of the longitudinal axis 19. In the example shown in FIG. 11, the perimeter includes a portion 74 that does not have a constant radius of curvature. The portion 74 in FIG. 11 includes a straight line, however, other shapes curved or other that does not match the radius of curvature of the circumferential portion 60 can be used.

As discussed herein, scan data of the coronal-most surface 20 and the circumferential portion 60 are shape matched to a corresponding virtual healing abutment such that the location of the healing abutment 10 within the 3D virtual model (or 3D model) is known. The coronal-most surface 20 and the circumferential portion 60 are the "hard codes" (also "first codes", "first informational markers" or "first scannable features") that the present inventors have determined need to be as accurate as possible. In order to increase the accuracy, the hard codes are separated from any other codes and are simplified making shape-matching more accurate.

Figure 8B:
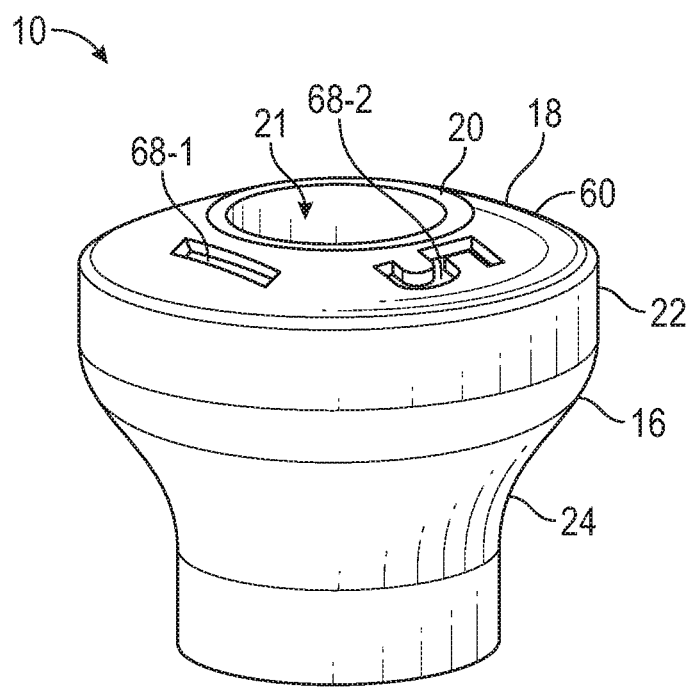
FIG. 8B is a perspective view of the healing abutment in FIG. 8A.
Figure 8C:
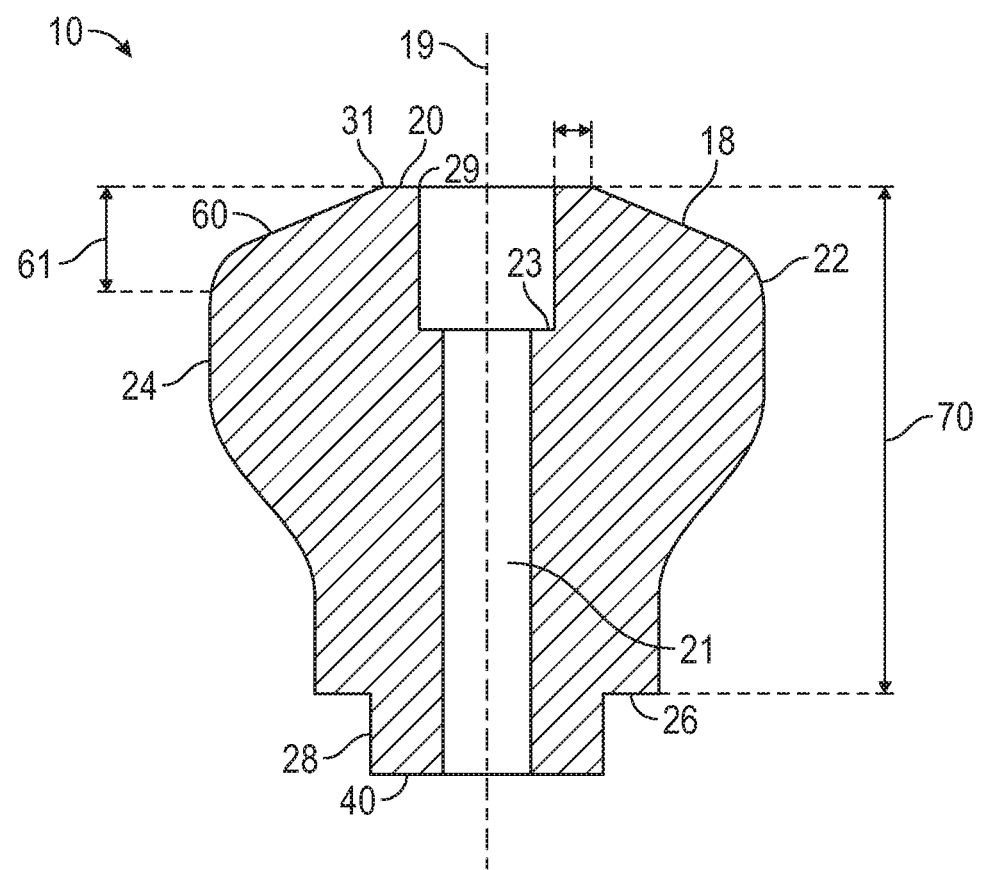
FIG. 8C is a cross-sectional view of the healing abutment in FIGS. 8A and 8B.

FIG. 8C illustrates a height 70 of the abutment 10 from the seating surface 26 to the coronal-most surface 20, a width 72 of the coronal-most surface 20, which, in this example, is a ring shape, and a length 61 of the circumferential portion 60 is known. In an example, once the coronal-most surface 20 and the circumferential portion 60 of the scan data is shape-matched to a corresponding virtual healing abutment, the top surface of the implant can be determined known since the height of the virtual healing abutment is known. As discussed herein, the height of the virtual healing abutment can be determined from one or more "soft codes" (also "second code", "second informational marker" or "second scannable features). That is, the soft code only provides information regarding the healing abutment but does not have be shape matched.

As discussed herein, the top surface 18 can be configured such that when the healing abutment 10 is scanned by scanning system information about the position and orientation of the implant 42 can be deduced based upon the first informational markers of the top surface 18 of the healing abutment 10.

The coronal-most surface 20 is a planar surface and in the example shown in FIG. 8C is perpendicular to the longitudinal axis. The planar surface is a simple reference surface to match to, however, non-planar coronal-most surfaces are contemplated. In other examples, the coronal-most surface 20 can form an acute angle with the longitudinal axis. For example, in instances where an angled healing abutment is placed in the mouth, the coronal-most surface surrounding the bore of the healing abutment may need to be angled. In one example, the coronal-most surface forms an angle of about 45 degrees relative to the longitudinal axis. In one example, the angle of the coronal-most surface to the longitudinal axis is between 10 degrees and degrees.

In an example, the healing abutment 10 can also have characteristics (one or more second informational markers) that can be used to transfer or convey information about the physical characteristics of the healing abutment 10 and/or the dental implant 42, such as, for example, the size, diameter, height, manufacturer, emergence profile shape, cross-sectional shape, or platform type of the component, among others. However, even with this information conveyed to a user, the alignment of the coronal-most surface 20 and the circumferential portion 60 of the 3D model of the scan data with the virtual healing abutment is what allows a user to determine, within the 3D model, the location and orientation of the dental implant. The second informational markers can be located on the top surface 18 or a side surface 24 of the healing abutment. Further, the second informational markers might not be included in the scan data and be a note in the file accompanying the scan data.

In one example, the healing abutment 10 can be coupled to the dental implant 42 and can remain coupled to the dental implant 42 during a first period of time and, in one example, this first period of time can correspond to a healing period in which the gingival tissue can be shaped by the side surface 16 of the healing abutment 10. After the first period of time, the healing abutment 10 can be removed and a final restoration or a portion of a final restoration can be attached to the dental implant 42. The top surface 18 can include scannable features of which can convey information about the position, orientation and/or physical characteristics of the healing abutment 10 and/or the dental implant 42. As explained herein, the top surface 18 can be recorded through the use of an intra-oral scanner and/or through the use of a physical impression. Accordingly, the healing abutment 10 can function as a scan body that is used to determine the orientation and position of the dental implant 42.

FIGS. 8A and 8B illustrate second informational markers including indicia 68-1, 68-2 (referred to collectively as "indicia 68") that are included on the top surface 18. However, the indicia 68 can be provided on the side surface 16 or in a note section that is delivered with the scan data. The indicia 68 can include number, letters, symbols, or other distinguishing features and can include one or more indicia. In one example, the indicia 68 is formed such that it can be recorded by the intra-oral scanner or impression materials. The indicia 68 can relay various types of information about the healing abutment 10 or the underlying implant 42. For example, while the coronal-most surface 20 and the circumferential portion 60 are shape matched with a corresponding virtual healing abutment, the indicia 68 is ignored during the shape matching process. In one example, the coronal-most surface 20 and the circumferential portion 60 can be characterized as "first scannable features" or "hard codes" and the indicia 68 can be characterized as "second scannable features" or "soft codes." The hard codes are the reference surfaces used to determine the position and orientation of the healing abutment within the 3D virtual data. By simplifying the scannable features and aligning (e.g., shape matching) to only the first scannable features and, e.g., not all scannable features on the top surface 18, to obtain the position and orientation of the healing abutment on a coordinate system, the accuracy of the position and orientation of the implant is increased. The second scannable features or "soft codes" can be part of the scan data (or else noted in a file accompanying the scan data). In one example, the indicia 68 (provided as scannable feature or accompanying the file) can be used to determine the corresponding virtual healing abutment. For example, there can be various different healing abutments for different locations in the mouth, different sizes, different implant connections, and side profile shapes. Once the virtual healing abutment is selected, the virtual healing abutment is shaped matched to the healing abutment in the 3D model. That is, the coronal-most surface 20 and the circumferential portion 60 are shape matched such that at least the central axis and the seating surface of the dental implant can be determined within a coordinate system. The information provided by the indicia 68 can be used to determine other features of the healing abutment and/or dental implant 10. For example, the indicia 68 can provide implant type, connection type, shape of healing abutment 10 (including side surface 24 and the edge 22), among others. While the shape of the healing abutment along the side surfaces as well as the cross-sectional shapes are known based on the indicia 68, these do not need to be as accurately shaped matched as the hard codes.

As discussed herein, once the virtual healing abutment is shape matched and merged with the 3D virtual model, the first informational markers (the coronal-most surface 20 and circumferential portion 60) are locked in five of the six degrees of freedom. The only unknown is the translation location along the Z-axis. However, the location along the Z-axis can be determined based on the height of the virtual healing abutment, which is known from the second informational marker that identified the virtual healing abutment. Thus, the first informational makers act as reference surfaces from which the location and orientation of the dental implant can be determined.

FIGS. 12-15 illustrate examples of various healing abutments 10, 10-1, 10-2, and 10-3. As seen, the shape of the edges 22, 22-1, 22-2, 22-3 can vary as well as the shape of the side surfaces 24, 24-1, 24-2, 24-3 and the heights 70, 70-1, 70-2, 70-3. While four different healing abutments are shown, there can be any number of healing abutments having different edge and emergence profile shapes and sizes. In one example, the dental practitioner can be provided with a set of healing abutments having different base diameters, different heights, different shapes, and different connection mechanisms. The practitioner can select an appropriate healing abutment based on the tooth being replaced, implant used, and other factors based on the patient and surrounding area.

After a healing abutment with the scannable features has been placed, scan data is obtained of the mouth including with the healing abutment without the use of, e.g., an impression coping. The scan data can be obtained from scanning the mouth of a patient or creating an impression and scanning either the impression or a stone model made from the impression. Since the scannable features are disposed on the top and/or side of the healing abutment, the user (e.g., laboratory) has all necessary information to define the gingival aperture, the implant size, and the orientation of the underlying implant and hex. This enables the laboratory to quickly prepare the permanent components. The system of the present invention also allows the maintenance of the soft tissue surrounding the healing abutment whereas, in prior systems, the soft tissue would close once the healing abutment was removed. The system spares the patient the pain of removing the healing abutment to obtain a scan of the implanted dental implant.

Figure 16:
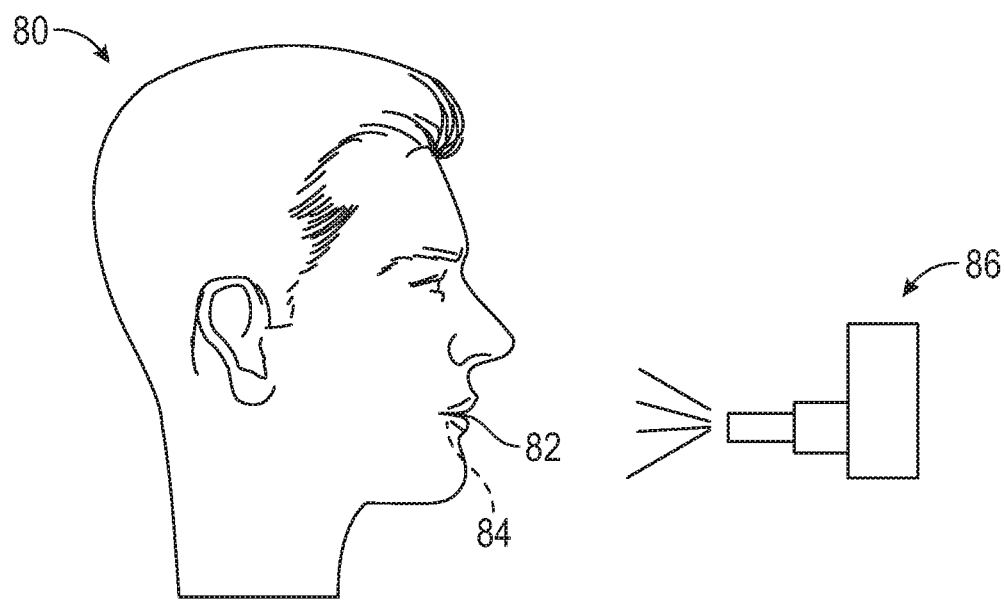
FIG. 16 illustrates a patient and scanner, according to one exemplary embodiment.

To create a permanent prosthesis, the dental region is scanned, as described above, from a stone model, from the impression material, or directly in the mouth using a scanning technique, a photographic scanning technique, or a mechanical sensing technique. FIG. 16 shows a scanning technic where an intraoral scanner 86 can take a scan in the mouth cavity 82 of the patient 80. The user can take the scan of the healing abutment, surrounding teeth, surrounding soft tissue, and other components that have been placed into or adjacent to the patient's jawbone 84.

Figure 17:
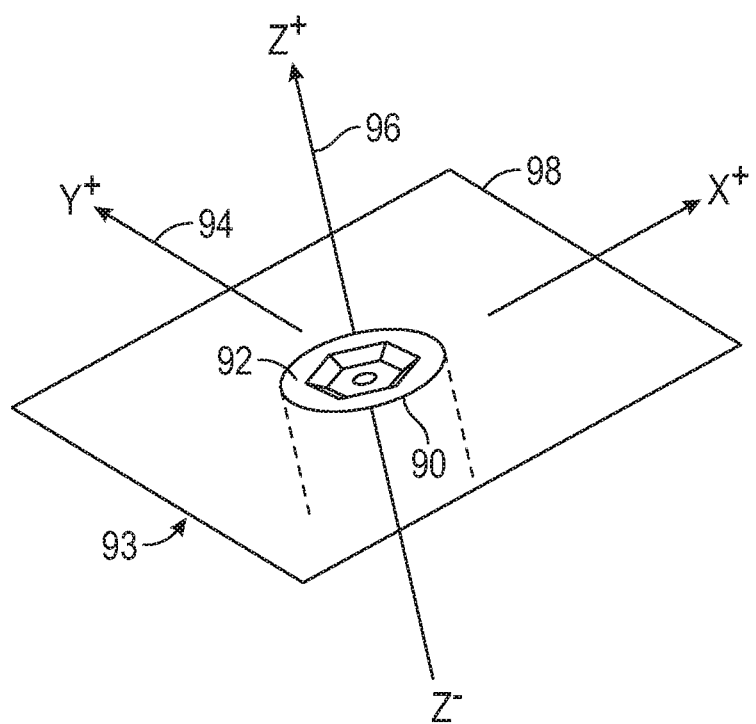
FIG. 17 illustrates a perspective view of a coordinate system, according to one exemplary embodiment.

Referring to FIG. 17, when scanning techniques are used to learn of the information about the healing abutment, the computer software is able to determine the position and orientation of a virtual implant 90 relative to the adjacent teeth and soft tissue. The determined position of the virtual implant 90 can represent the location and orientation of the dental implant installed within the patient's mouth. The position of the virtual implant 90 is defined in a Cartesian coordinate system having "X," "Y," and "Z" axes. The common point is at the intersection of the centerline of the implant and a plane 93 representing the top surface 92 of the implant 90.

As noted above, the second scannable features assist in determining the height of the healing abutment above the implant. This height can be used to identify the zero point on the "Z" axis, which is in the plane 93 containing the seating surface 92 of the implant 90. The "Y" axis 94 is within the plane 93 representing the seating surface 94 with the positive "Y" direction as close to the direction of facial to buccal as possible. The "X" axis 98 is in the plane 93 and is perpendicular to an implant hex face. Thus, the width of the seating surface 92 in the plane 93 is known, as is the width of the healing abutment emerging through the gingiva. Thus, the emergence profile of the artificial tooth is known, as well.

Figure 18:
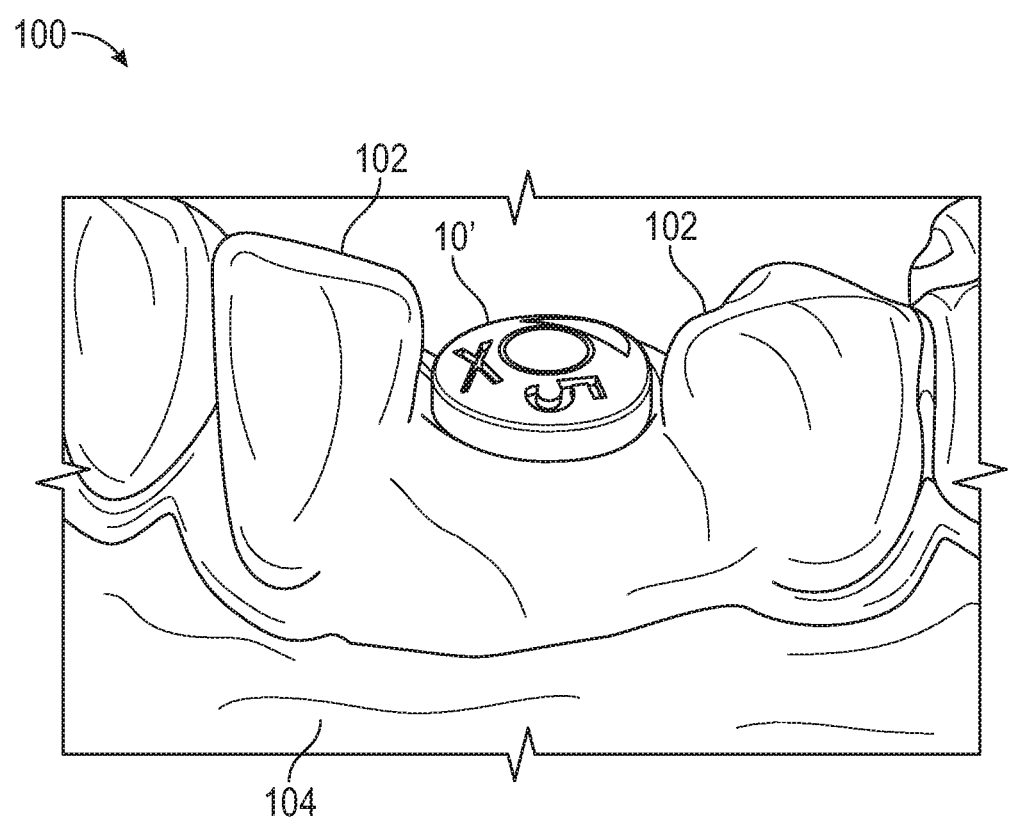
FIG. 18 illustrates a perspective view of 3D virtual model of patient's mouth, according to one exemplary embodiment.

Once scanned, the scan data can include healing abutment data, soft tissue data, and any surrounding teeth data. The scan data is transferred into a graphical imaging program, such as a Computer Aided Design ("CAD") program so that a three-dimensional ("3-D") CAD model 100 (referred to herein as "3D virtual model 100" or "3D model 100") of the patient's mouth is created, as shown in FIG. 18. As seen in FIG. 18, the 3D model 100 includes the top surface and a portion of the side surface of the healing abutment 10', as well as gingiva 104 and surrounding teeth 102. As discussed herein, the healing abutment 10' in the 3D model 100 can be replaced or merged with a virtual healing abutment, as discussed herein. That is, a user can shape-match the virtual healing abutment with the healing abutment in the 3D model 100 and merge the data together to form a first modified 3D model.

In order to select the correct virtual healing abutment to merge with the scan data, a system can either run a shape-matching algorithm to go through all the virtual healing abutments within the library until an exact fit is found, or information from the second informational marker can be used to pick the virtual healing abutment from the library of virtual healing abutments.

Figure 19A:
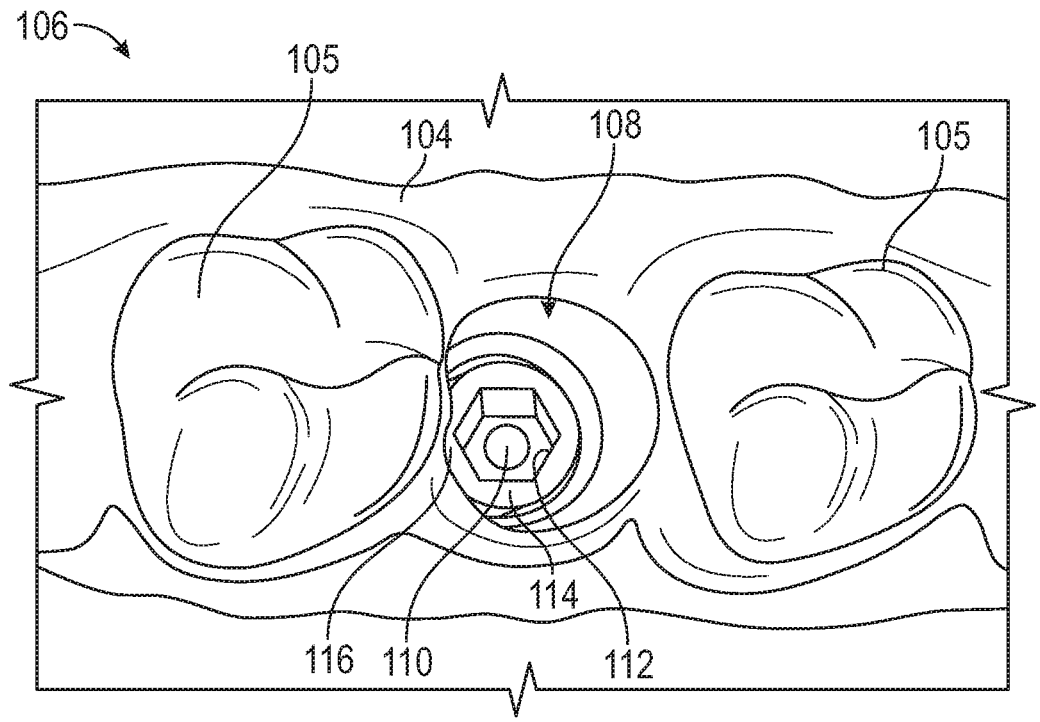
FIG. 19A illustrates a perspective view of a modified 3-D virtual model of FIG. 18 with the healing abutment removed from the 3D virtual model.
Figure 19B:
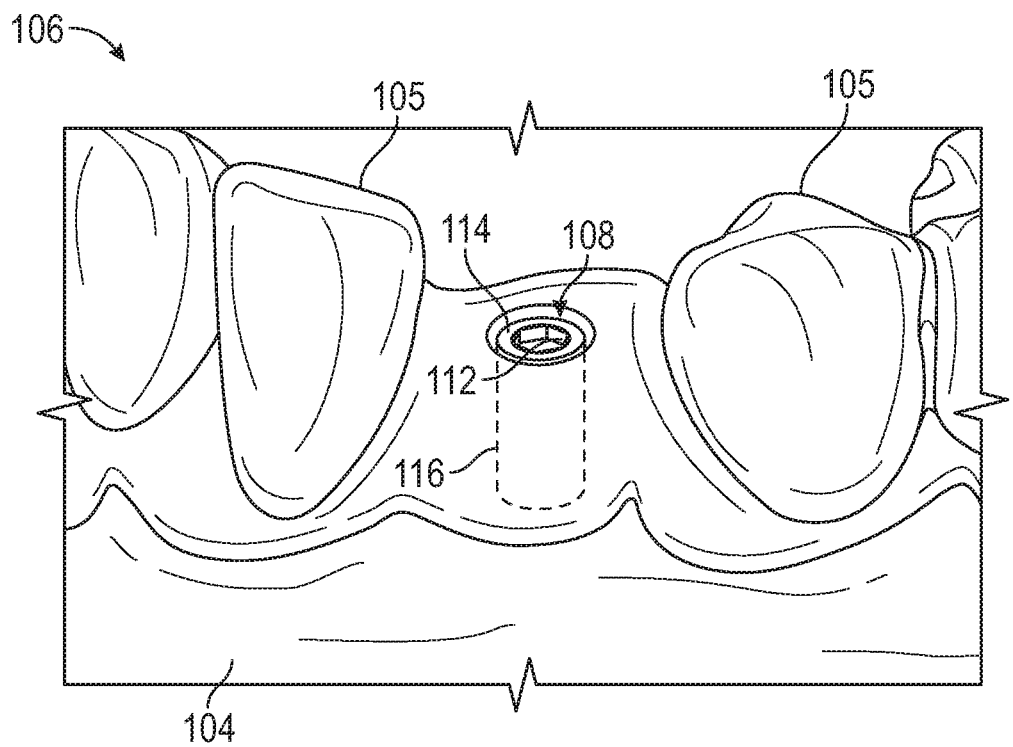
FIG. 19B illustrates a perspective view of a modified 3-D virtual model of FIG. 18 with the healing abutment removed from the 3D virtual model.

As shown in FIGS. 19A and B, the 3D model 100 of the patient's mouth is then further modified to create a second modified CAD model 106 that removes the virtual healing abutment that replaced the healing abutment 10 in the 3D model 100. By removing the virtual healing abutment, an opening 108 within the soft tissue and the orientation and location of at least a seating surface 114 (or top surface) of a virtual implant 116 is known within the coordinate system. As disused, a virtual representation of the seating surface can be displayed in the second modified 3D model 106; however, the virtual representation does not need to be visualized once the coordinate system is known. The seating surface 114 of the virtual implant 116 matches the position and location of the top surface of the dental implant installed in the patient's mouth. For example, the seating surface 114, bore 110, and anti-rotational feature 112 can be displayed in the second modified 3D model 106. In one example, as seen in FIG. 19B, the outline of the virtual implant installed in the patient's mouth can be shown in the second modified 3D model 106. However, the location and orientation of the seating surface 114 is the portion of the dental implant that is needed to design the final restoration.

The virtual healing abutment can be shaped matched, as discussed herein, to the healing abutment 10 represented in the 3D virtual model 100 forming the first modified CAD model 106. Once shape matched, the virtual healing abutment can be removed (or subtracted) from the 3D model such that, at least, the location and orientation of the seating surface of the dental implant are known in the second modified 3D model 106. The opening 108 is the opening extending through the soft tissue and has the shape of the contours of the healing abutment. As discussed herein, the second modified 3D model 106 is formed by determining, e.g., from the indicia on the healing abutment 10, what virtual healing abutment corresponds to the healing abutment installed in the patient's mouth.

The CAD program is additionally used to design a custom, patient specific, dental component to be adapted to attach to the implant. In one example, the dental component can be a custom abutment. The custom abutment supports a final prosthesis, often referred to as a crown. The second modified 3D model 106 is used to design the abutment and/or crown to fit within the soft tissue and between the adjacent teeth based on the specific dimensions and conditions of a patient's mouth. Thus, obtaining an accurate position of the dental implant is critical to designing an accurate dental abutment and final prosthesis. However, as discussed above, the soft tissue profile shape is not as important as the location and orientation of the implant. Once the CAD program has been used to design a custom abutment, the design of the custom abutment is input into a precision manufacturing device, such as a CNC milling machine, to create the custom abutment from a blank of metal, usually titanium, or a titanium alloy, or from a ceramic material.

The top surface 18 (including the coronal-most surface 20 and the circumferential portion 60) of the healing abutment 10 can be used to determine the orientation and position of the top surface 114 (seating surface) and a non-rotational feature 112 (e.g., indexing portion) of the dental implant 116 within a 3D model.

Figure 20:
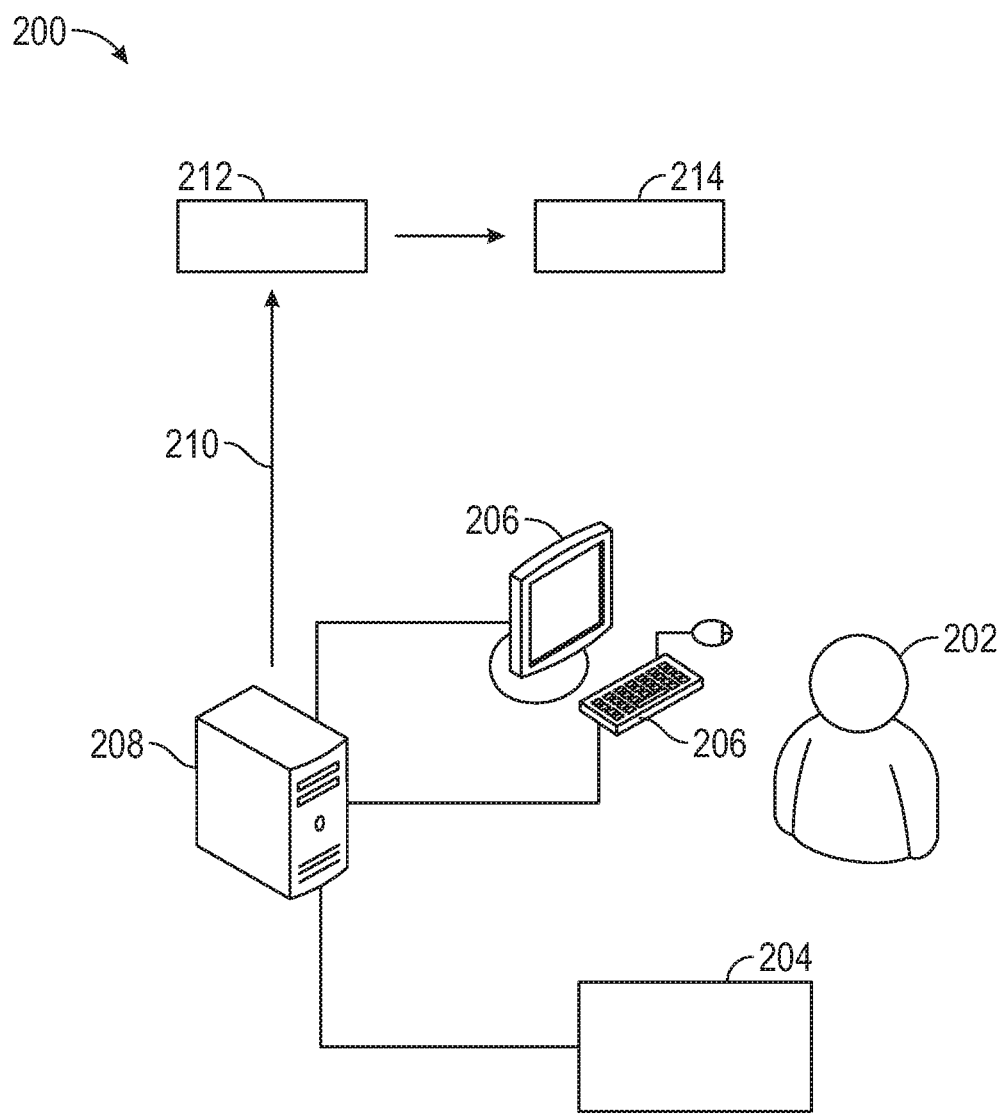
FIG. 20 illustrates a system, according to one exemplary embodiment.

A system 200 is shown in FIG. 20, the scan data, taken via a scanner 204, of the healing abutment 10 and the surrounding structure of the patient's anatomy (e.g., adjacent teeth, gum tissues and/or implants or abutments) can be transferred to an analysis system 208. A 3D virtual model of the scan data can be created. The analysis system 208 can utilize shape matching to identify the orientation and position of the first informational markers of the healing abutment 10 within the 3D virtual model. In such an arrangement, the first informational markers can be used to determine the longitudinal center axis of the healing abutment 10 and thus the longitudinal center axis of the dental implant 116 upon which the healing abutment 10 is mounted. The first informational markers can also be used to determine the position in space of the healing abutment within a coordinate system. Once the position in space within a coordinate system of the healing abutment 10 is determined, the size and shape of the particular healing abutment is determined and a vector for the position and orientation of the top surface and/or non-rotational feature (e.g., indexing portion) can be determined from the position and orientation of the top surface 18 of the healing abutment 10. As discussed herein, as the first informational markers are shape matched, five degrees of freedom of a coordinate system are locked in place, the only unknown is where the seating surface is located along the Z-axis. Information from the second informational marker(s) allows a user to determine which virtual healing abutment matches the healing abutment in a user's mouth and the dimensional information can be determined. As discussed herein, the height of the virtual healing abutment can be used in reference with the shape-matched first informational markers so that the location and orientation of the seating surface can be locked along the Z-axis.

In one embodiment, the type of healing abutment 10 can be entered into the analysis system 208 by a user 202 through an input device 206 (e.g., a computer keyboard or mouse) or can be determined via indicia within the healing abutment scan data. The type of healing abutment 10 can provide the analysis system 208 with information regarding the physical structure (e.g., height and diameter of healing abutment, edge shape, profile shape, etc.). As noted above, the known physical structure of the healing abutment 10 can be combined with the position and orientation of the first informational markers to determine the orientation and location of the seating surface of the implant and the orientation of the non-rotational feature of the implant. In this manner, the user 202 of the analysis system 208 can design a final restoration 214 (e.g., a dental abutment) that can mate accurately with the dental implant installed in the patient's mouth.

As discussed herein, the first scannable features can be used to determine the position and orientation of the dental implant. That is, once-shaped matched to the healing abutment data in the 3D virtual model, the first scannable features can be used as reference surfaces such that the location and orientation of at least the seating surface of the dental implant is known. The second scannable features can provide information to the user 202 about the healing abutment. For example, second scannable features do not need to be shape matched and can be entered into the analysis system 208 to determine the information regarding the physical structure of the healing abutment 10 and what virtual healing abutment represents the healing abutment 10 coupled to the dental implant in the patient's mouth. While the second scannable features can be provided in the scan data, they are not part of the shape matching process. The soft codes are ignored while the position and orientation of the top surface 18 (including the first informational markers) is being shape matched with a virtual healing abutment.

In one example, the user 202 can view the final restoration on a computer screen 206 or similar device and/or plan and design the final restoration using the computer screen 206. Production data 210 regarding the shape (dimensional data) and construction of the final restoration can be sent to a production facility 212. The production facility 212 can produce the final restoration 214 according to the production data 210.

In one example, the analysis system 208 can match the shape of the first informational markers on the top surface 18 against a stored library of top surface shapes of virtual healing abutments and in this manner the analysis system 208 can match a top surface 18 of the healing abutment that has been scanned by the scanning system. In an example, the analysis system 208 can receive input from the user 202 regarding the second informational maker (one or more indicia) on a surface of the healing abutment or provided separately and can automatically determine which virtual healing abutment in the stored library matches the healing abutment attached to the dental implant in the patient's mouth. The analysis system 208, now having identified the virtual healing abutment that matches the healing abutment within the patient's mouth, can shape match the first informational markers on the selected virtual healing abutment to the healing abutment in the 3D virtual model. As discussed herein, this provides a coordinate system with the 3D virtual model. Once shape matched, the analysis system 208 knows five degrees of freedom of the virtual healing abutment within the 3D virtual model. The analysis system 209 can determine, among other things, dimensional information of the virtual healing abutment 121 to use with the shape-matched first informational markers to determine the last degree of freedom, which is the translational positions along the Z-axis. The location of the seating surface is beneath the healing abutment and not shown with the scan data from the patient. Thus, this information (height of the healing abutment) can be provided separately from the first informational markers, since the translational location along the Z-axis is binary and is determined from the coronal-most surface of the healing abutment and the height of the healing abutment. The second informational marker can provide other physical characteristics of the virtual healing abutment (e.g., diameter, emergence profile shape, and/or type of healing abutment), which can be used in combination with the orientation and position of the first informational markers of the healing abutment 10 to determine the shape of the soft tissue surrounding the healing abutment.

Figure 22:
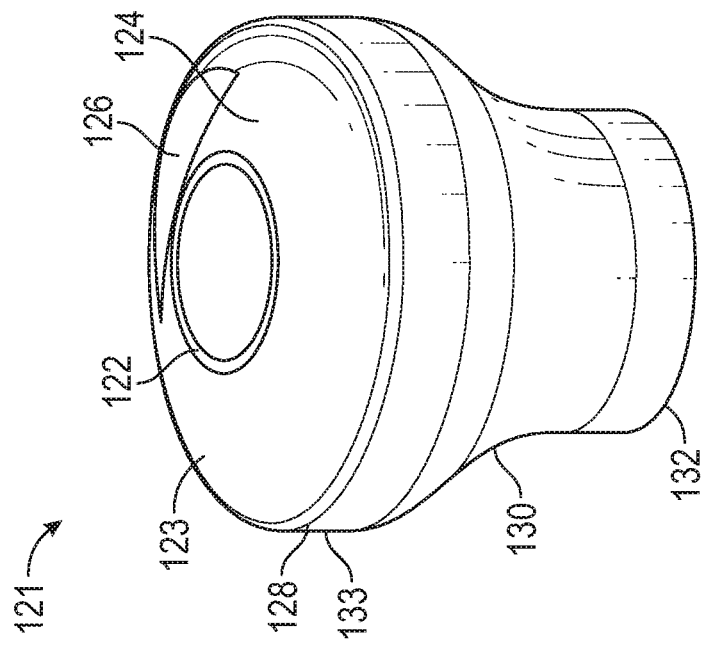
FIG. 22 illustrates a virtual model of a healing abutment from a healing abutment library, according to one exemplary embodiment.
Figure 21:
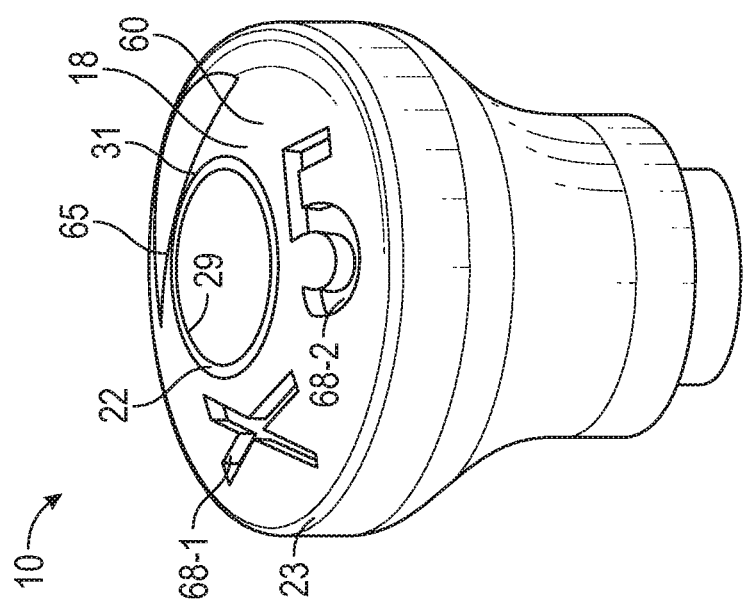
FIG. 21 illustrates a perspective view of a healing abutment, according to one exemplary embodiment.

FIG. 21 illustrates an exemplary healing abutment 10. As seen in FIG. 18, the scan data includes healing abutment data. That is, the scan data from the patient includes at least the top surface 18 of the healing abutment 10 and includes the first scannable features (e.g., the coronal-most surface 20 and the circumferential portion 60) and, in some examples, the second scannable features (e.g., the indicia 68), as the second scannable features can be provided outside of the scan data. As discussed herein, while both scannable features are provided in the scan data, only the first scannable features are shaped matched such that a coordinate system within the 3D virtual model is known and the position and orientation of the dental implant can be determined. FIG. 22 illustrates an example virtual healing abutment selected from a library of virtual healing abutments. The library of virtual healing abutments can include a variety of healing abutments for different teeth being replaced and for different implants installed in the patient. Whether through only shape matching or through the use of the second informational markers, the selected virtual healing abutment. is used to shape match to the healing abutment provided in the 3D virtual model formed from the scan data. As seen in FIG. 22, the virtual healing abutment 121 includes a top surface 123 including the first informational markers (i.e., a coronal-most surface 122 and a circumferential portion 124). The top surface 123 also includes a cutout 126 and an edge 128. While the apical end 132 and the side surface 133 including the emergence profile 130 is also shown, those dimensions are not shaped matched to and can be provided once the orientation of the healing abutment is known. For example, once the coordinate system is determined within the 3D virtual model by shape matching the first informational markers between the healing abutment in the 3D virtual model with the virtual healing abutment 121, the position and orientation of the virtual healing abutment 121 within the 3D model is known in five degrees of freedom. Since the dimensional information (e.g., height) is known from the selected virtual healing abutment 121, the position and orientation of the seating surface of the dental implant can be determined from the shape-matched first informational markers. Additional information such as diameter, emergence profile, among others, is also known. As seen in FIG. 22, the indicia 68 from the healing abutment is not present on the virtual healing abutment. Since it is not used for shape matching the indicia does not need to be present on the virtual healing abutments. In other examples, the indicia can be present even though it is not being used for shape-matching.

Referring to FIGS. 12-15, the shape of the edge of the top surfaces across the sizes of illustrated healing abutment are different. As noted above, the analysis system 208 can utilize shape-matching to identify the orientation and position of the healing abutment with respect to the patient's anatomy. That is, the coronal most-surface 20 and the circumferential portion 60 can be shaped match. In one embodiment, the type of abutment can be entered into the analysis system 208 (e.g., by a user of the system reading the indicia) which provides the analysis system with information regarding the physical structure (e.g., height and diameter of the healing abutment). The known physical structure of the healing abutment can be combined with the measured position and orientation of the coronal-most surface and the circumferential portion to determine the orientation and position of the seating surface of the dental implant and the orientation of the non-rotational feature of the dental implant.

With reference to FIG. 20, the system 200 can include comprise one or more computers (analysis system 208) that can be coupled to one or more displays 206, one or more input devices 206, and one or more scanners 204, such as an intra-oral scanner. The user or operator 202, who may be a dentist, dental technician, or other person, may plan the data for dental prosthetics analysis system by manipulating the one or more input devices 206, which may be a keyboard and/or a mouse. In some embodiments, while working on a design for final restoration, the operator 202 can see a plan for the final restoration on the display 206. In modified embodiments, the scanner can be a scanner (e.g., a table top scanner) configured to scan an impression or a stone plaster analogue in embodiments in which a physical impression is take of the healing abutment.

In various embodiments, the analysis system 208 may include one or more computers with one or more processors, one or more memories, and/or one or more communication mechanisms. In some embodiments, more than one computer may be used to execute the modules, methods, and processes discussed herein. Additionally, the modules and processes herein may each run on one or multiple processors, on one or more computers; or the modules herein may run on dedicated hardware. The input devices 206 may include one or more keyboards (one-handed or two-handed), mice, touch screens, voice commands and associated hardware, gesture recognition, or any other means of providing communication between the operator 202 and the computer.

The display 206 may be a 2D or 3D display and may be based on any technology, such as LCD, CRT, plasma, projection, et cetera. The scanner 204 may be a 2D or 3D scanner. The scanner 204 can be an intra-oral scanner or another type of scanner (e.g., scanners that are not configured to take intra-oral scans). In some embodiments, 3D scanning in scanner 204 is accomplished using time-of-flight calculations, triangulation, conoscopic holography, structured light, modulated light, computed tomography, microtomography, magnetic resonance imaging, or any appropriate technology or technique. In some embodiments, 3D scanner may use x-rays, visible light, laser light, ultrasound radiation, or any other appropriate radiation or technology. In some embodiments, the 3D scanner may use stereoscopy, photometry, silhouetting, touch probe, or any other appropriate technique. In a preferred embodiment, the scanner 204 is an intra-oral scanner The communication among the various components of system of FIG. 20 may be accomplished via any appropriate coupling, including USB, VGA cables, coaxial cables, Fire-Wire, serial cables, parallel cables, SCSI cables, IDE cables, SATA cables, wireless based on 802.11 or Bluetooth, or any other wired or wireless connection(s). One or more of the components in system may also be combined into a single unit. In some embodiments, all of the electronic components of system shown in FIG. 20 are included in a single physical unit.

Figure 23:
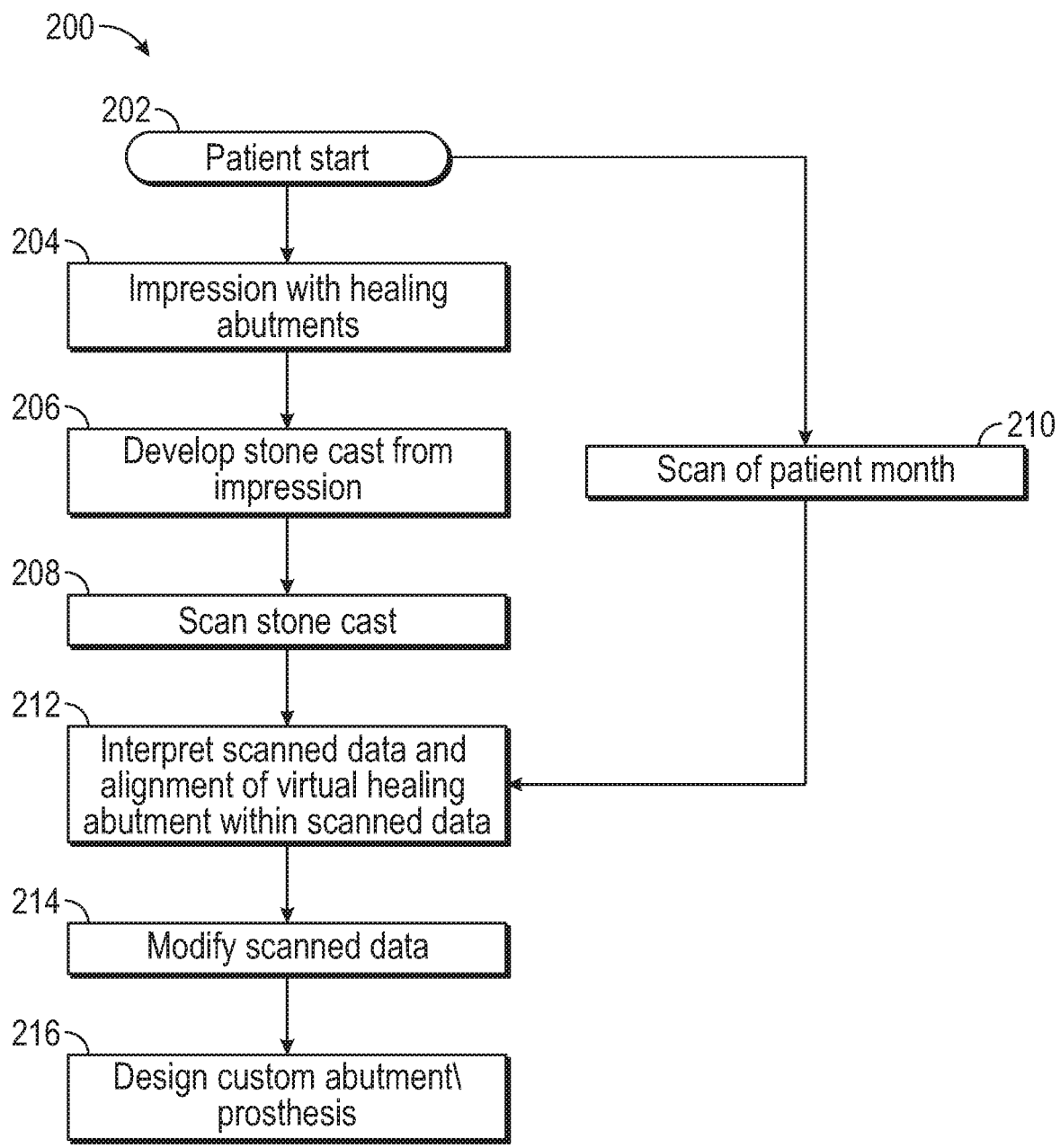
FIG. 23 illustrates a method flow chart, according to one exemplary embodiment.

With reference now to FIG. 23, one embodiment for a method 200 of use is provided. At step 202, an implant is provided and can be implanted into the bone tissue of a patient and a healing abutment can be coupled to the implanted implant. If a physical impression is to be made, the method 200 can include steps 204-208, where, at step 204, an impression of the patient's mouth including the healing abutment is taken, at step 206, a stone model is created from the impression, and at step 208, a scan is taken of the stone cast including at least the top surface of the healing abutment and surrounding teeth. Instead of creating a stone model or scanning the impression, at step 210, an intra oral scanner or other scanning instrument can be used to scan the top surface of the healing abutment inside the patient's mouth. Once scan data of the healing abutment inside the patient's mouth is taken (either from a stone model or an intra-oral scanner), at step 212, the scan data is received and interpreted. For example, a 3D virtual model of the scan data can be created. As discussed herein, a virtual healing abutment is merged with the scan data to provide the first modified 3D virtual model. The virtual healing abutment is used to determine a coordinate system within modified 3D virtual model. That is, the first informational markers of the healing abutment in the scan data are shape-matched to the first informational markers to a virtual healing abutment. By doing so, a coordinate system has been created and the location and orientation of the first informational markers of the virtual healing abutment is known within the modified 3D virtual model. Thereby, the location and orientation of the dental implant is also known but is only known in five degrees of freedom. That is because the seating surface of the dental implant is beneath the healing abutment, the location along the Z-axis is determined concurrently or subsequently to shape-matching the first informational markers once the height of the virtual healing abutment is determined.

As discussed herein, the present inventors have minimized and simplified the informational markers that are used for shape matching, since obtaining the location and orientation of the dental implant needs to be as accurate as possible.

At step 214, the first modified 3D model is further modified to form a second modified 3D model where the top surface (seating surface), non-rotational feature, and angular orientation (central axis) of the dental implant is shown. That is, based on the second informational markers that provide characteristics of the virtual healing abutment, the healing abutment can be subtracted from the modified 3D model to form a second modified 3D model that will show exactly the orientation and location of the seating surface of the dental implant. For example, the height of the virtual healing abutment is known, such that the distance the seating surface of the dental implant form the coronal-most surface is also known. This allows the analysis system 206 to remove the virtual healing abutment and illustrate at least the seating surface of the dental implant.

At step 216, once the position and orientation of the top surface, the longitudinal axis, and/or non-rotational features of the dental implant are known, the user can design the final restoration and subsequently manufacture of the final restoration.

After a period of time (e.g., healing and osseointegration period), the healing abutment can be removed from the dental implant and the final dental restoration like a single tooth, a bridge, or other framework, can be affixed to the dental implant at a connection interface thereof. As noted above, the final restoration can be designed and/or made based on the information (position and orientation) gathered from the healing abutment. As described above, the final restoration can be designed with the knowledge of the exact position and orientation of the dental implant which can be determined from the scan of the healing abutment and the information derived therefrom. The scan of the healing abutment can be taken before, during or after the period of time (e.g., healing and osseointegration period). As noted below, in certain embodiments, a physical impression of the healing abutment can be taken in addition to or as an alternative e to taking intra-oral scan of the healing abutment.

The processes, computer readable medium, and systems described herein may be performed on various types of hardware, such as computer systems. In computer systems may include a bus or other communication mechanism for communicating information, and a processor coupled with the bus for processing information. A computer system may have a main memory, such as a random access memory or other dynamic storage device, coupled to the bus. The main memory may be used to store instructions and temporary variables. The computer system may also include a read-only memory or other static storage device coupled to the bus for storing static information and instructions. The computer system may also be coupled to a display, such as a CRT or LCD monitor. Input devices may also be coupled to the computer system. These input devices may include a mouse, a trackball, or cursor direction keys. Computer systems described herein may include the computer, display, scanner, and/or input devices. Each computer system may be implemented using one or more physical computers or computer systems or portions thereof. The instructions executed by the computer system may also be read in from a computer-readable medium. The computer-readable medium may be a CD, DVD, optical or magnetic disk, laserdisc, carrier wave, or any other medium that is readable by the computer system. In some embodiments, hardwired circuitry may be used in place of or in combination with software instructions executed by the processor.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

A machine (e.g., analysis system or computer system) 208 may include a hardware processor (e.g., a central processing unit (CPU), a graphics processing unit (GPU), a hardware processor core, field programmable gate array (FPGA), or any combination thereof), a main memory and a static memory, some or all of which may communicate with each other via an interlink (e.g., bus). The machine 208 may further include a display unit 206 and an alphanumeric input device 206 (e.g., a keyboard), and a user interface (UI) navigation device (e.g., a mouse). In an example, the display unit 206, input device 206 and UI navigation device may be a touch screen display. The machine 208 may additionally include a storage device (e.g., drive unit).

The storage device may include a machine readable medium on which is stored one or more sets of data structures or instructions (e.g., software) embodying or used by any one or more of the techniques or functions described herein. The instructions may also reside, completely or at least partially, within the main memory, within static memory, or within the hardware processor during execution thereof by the machine 208. In an example, one or any combination of the hardware processor, the main memory, the static memory, or the storage device may constitute machine readable media.

The machine readable medium can be a single medium or multiple media (e.g., a centralized or distributed database, and/or associated caches and servers) configured to store the one or more instructions.

The term "machine readable medium" may include any medium that is capable of storing, encoding, or carrying instructions for execution by the machine 208 and that cause the machine 208 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions may further be transmitted or received over a communications network using a transmission medium via a network interface device utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device may include one or more physical jacks (e.g., Ethernet, coaxial, or phone jacks) or one or more antennas to connect to the communications network. In an example, the network interface device may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 208, and includes digital or analog communications signals or other intangible medium to facilitate communication of such software.

The healing abutments described herein can be made of a polymeric material such as a polyether ether ketone (PEEK) in other embodiments the healing abutment can be made of other materials such as a metal (e.g., titanium). The healing abutments can be made of a single monolithic piece of material (e.g., injection molded) however, in other embodiments, the healing abutments can be made from multiple pieces and/or pieces of different materials such as metal, ceramic, plastics or polymers.

In one example, the top surface of the healing abutment that is configured to be scanned has a roughened surface having a roughness value of (Ra) from about 0.05 Ra to about 0.5 Ra. The roughened surface increases the scannability. Further, the surface of the abutment can further be anodized to include a pink color for aesthetic reasons during healing.

Examples & Various Notes

Each of these non-limiting examples can stand on its own, or can be combined in various permutations or combinations with one or more of the other examples Example 1 provides receiving scan data including at least healing abutment data representing a healing abutment attached to a dental implant installed in a patient's mouth, the healing abutment data including first informational markers on a top surface of the healing abutment, the first informational markers including: a coronal-most surface; and a circumferential portion between the coronal-most surface and an edge defining a boundary between the top surface and a side surface of the healing abutment, wherein the circumferential portion has a constant taper along a portion of the top surface between the coronal-most surface and the edge and has a constant radius of curvature along a plane perpendicular to the longitudinal axis; creating a three-dimensional (3D) virtual model of the scan data; determining a location an orientation of a portion of a virtual dental implant within the 3D virtual model based on the first informational markers, the virtual dental implant corresponding to the dental implant installed in the patient's mouth; and developing the virtual dental component including dental component dimensional information based on the location and orientation of the dental implant.

In Example 2, the subject matter of Example 1 optionally includes wherein the first informational markers include a scannable feature indicating a non-rotational feature of the dental implant.

In Example 3, the subject matter of Example 2 optionally includes where wherein the coronal-most surface is planar.

In Example 4, the subject matter of Examples 1-2 optionally includes wherein the coronal-most surface is perpendicular to the longitudinal axis of the healing abutment.

In Example 5, the subject matter of Examples 1-3 optionally includes where wherein the coronal-most surface includes an inner ridge and an outer ridge.

In Example 6, the subject matter of Examples 1-4 optionally includes wherein the healing abutment data includes at least one second informational marker that that allow identification of a height of the healing abutment.

In Example 7, the subject matter of Example 6 optionally includes where the at least one second informational marker allows identification of at least one of: a shape of the profile of the healing abutment; a connection type of the dental implant; a cross-sectional shape of the healing abutment; and a width of the healing abutment.

In Example 8, the subject matter of Examples 1-7 optionally includes where determining the location and orientation of the dental implant within the 3D virtual model includes: selecting a virtual healing abutment from a library of healing abutments that matches the healing abutment attached to the dental implant installed in the patient's mouth, the virtual healing abutment including virtual first informational markers; and merging the virtual healing abutment with the healing abutment data by shape matching the first informational markers with the virtual first informational markers of the virtual healing abutment to form a first modified 3D model.

In Example 9, the subject matter of Example 8 optionally includes forming a second modified 3D model by subtracting the virtual healing abutment from the first modified 3D model, wherein the second modified 3D model illustrates the location and orientation of at least a seating surface of a virtual dental implant, the location and orientation of the seating surface of the virtual dental implant corresponding to the location and orientation of a seating surface of the dental implant installed within the patient's mouth.

Example 10 provides a system for designing a virtual dental component, when executed by at least one processor, cause the at least one processor to perform operations to: receiving scan data including at least healing abutment data, the healing abutment data representing a healing abutment attached to a dental implant installed in a patient's mouth, the healing abutment data including first informational markers on a top surface of the healing abutment, the first informational markers including: a coronal-most surface; and a circumferential portion between the coronal-most surface and an edge defining a boundary between the top surface and a side surface of the healing abutment, wherein the circumferential portion has a constant taper along a portion of the top surface between the coronal-most surface and the edge and has a constant radius of curvature along a plane perpendicular to the longitudinal axis; create a three-dimensional (3D) virtual model of the scan data; determine a location an orientation of the dental implant within the 3D virtual model based on the first informational markers; and develop the virtual dental component including dental component dimensional information based on the location and orientation of the dental implant.

In Example 11, the subject matter of Example 10 optionally includes where the healing abutment data includes at least one second informational marker that allows identification of a height of the healing abutment.

In Example 12, the subject matter of Example 11, optionally includes wherein the second informational markers further allow identification of at least one of: a shape of the profile of the healing abutment; a connection type of the dental implant; a cross-sectional shape of the healing abutment; and a width of the healing abutment.

In Example 13, the subject matter of Examples 10-12 optionally includes where determining the location and orientation of the dental implant within the 3D virtual model cause the at least one processor to perform operations to: select a virtual healing abutment from a library of healing abutments that matches the healing abutment attached to the dental implant installed in the patient's mouth, the virtual healing abutment including virtual first informational markers; and merge the virtual healing abutment with the healing abutment data by shape matching the first informational markers with the virtual first informational markers of the virtual healing abutment to form a first modified 3D model.

In Example 14, the subject matter of Example 13 optionally includes where determining the location and orientation of the dental implant within the 3D virtual model cause the at least one processor to further perform operations to: form a second modified 3D model by subtracting the virtual healing abutment from the first modified 3D model, wherein the second modified 3D model illustrates the location and orientation of at least a seating surface of a virtual dental implant, the location and orientation of the seating surface of the virtual dental implant corresponding to the location and orientation of a seating surface of the dental implant installed within the patient's mouth.

Example 15 provides a healing abutment for coupling to a dental component, comprising a body extending from a coronal end portion to an apical end portion, the body including: a side surface; and a top surface defining an edge and having a first informational makers including: a coronal-most surface; and a circumferential portion extending between the coronal-most surface and the edge, where the circumferential portion tapers from the coronal-most surface toward the edge and has a constant radius of curvature along a plane perpendicular to the longitudinal axis.

In Example 16, the subject matter of Example 15 optionally includes where the coronal-most surface is planar and perpendicular to a longitudinal axis of the body.

In Example 17, the subject matter of Examples 15-16 optionally includes where the circumferential portion of the top surface tapers from the coronal-most surface toward the edge at a constant taper angle.

In Example 18, the subject matter of Examples 15-17 optionally includes where the circumferential portion of the top surface that tapers has a circumferential length of at least fifteen degrees around the longitudinal axis.

In Example 19, the subject matter of Examples 15-18 optionally includes where a perimeter defined by the edge forms an asymmetrical shape.

In Example 20, the subject matter of Examples 15-19 optionally includes where the body includes at least one informational marker including indicia indicating at least a height of the healing abutment.

In Example 21 is any one or combination of the Examples or elements of the Examples 1-20.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method of designing a virtual dental component, the method comprising:
    receiving scan data including at least abutment data representing an abutment attached to a dental implant installed in a patient's mouth, the abutment data including first informational markers on a top surface of the abutment and a second information marker different from the first informational markers, the first informational markers including:
        a coronal-most surface positioned exteriorly to a bore for a retention screw and comprising an inner edge spaced from an outer edge and having a first predetermined angular relationship to an orientation of a longitudinal axis of the abutment;
        a circumferential portion between the outer edge of the coronal-most surface and a rounded peripheral edge defining a boundary between the top surface and a side surface of the abutment, wherein the circumferential portion has a constant taper along a portion of the top surface between the coronal-most surface and the rounded peripheral edge to form at least a portion of a conical surface extending substantially around the longitudinal axis and having a central axis with a second predetermined angular relationship to the orientation of the longitudinal axis of the abutment, wherein the coronal-most surface and circumferential portions are different surfaces and the coronal-most surface is positioned in a truncation plane of the at least a portion of the conical surface; and
        a cutout in the circumferential portion defining a ridge extending between peripheral edges of the abutment;
    creating a three-dimensional (3D) virtual model of the scan data;
    determining a virtual abutment in a library of different abutments that corresponds to the second informational marker, the virtual abutment including virtual first informational markers including a coronal-most surface, circumferential portion, and cutout having substantially the same shape as a corresponding first informational marker of the abutment;
    shape matching a shape of each of the coronal-most surface, circumferential portion, and cutout of the first informational markers of the abutment to a shape of the coronal-most surface, circumferential portion and cutout, respectively, of the virtual first informational markers on a corresponding virtual abutment to determine: based on the coronal-most surface and second information marker, a Z-axis location of a seating surface between the abutment and the dental implant; based on the second predetermined angular relationship of the central axis to the orientation of the longitudinal axis of the abutment, an orientation of the longitudinal axis of the virtual abutment, the orientation of the longitudinal axis of the abutment being the same as an orientation of the Z-axis, and a longitudinal axis of a virtual dental implant within the 3D virtual model; and, based on a position of the cutout, an orientation relative to X- and Y-axes of mating non-rotational features of the virtual abutment and virtual dental implant within the 3D virtual model; and
    developing the virtual dental component including dental component dimensional information based on the seating surface Z-axis location, Z-axis orientation, and X-Y axis orientation of the mating non-rotational features of the virtual abutment and virtual dental implant.

2. The method of claim 1, wherein the at least a portion of the conical surface has a constant radius of curvature along a plane perpendicular to the longitudinal axis, wherein, after matching, the first informational markers are locked in five of six degrees of freedom with a translational position of the first informational markers along the Z-axis being determined based on a height of the virtual abutment corresponding to the second informational marker and further comprising:
    merging the determined virtual abutment with the 3D virtual model whereby the coronal-most surface and the circumferential portion are fixed in five degrees of freedom and the first informational markers are locked translationally along the X-axis and Y-axis and locked rotationally along the X-axis, Y-axis, and the Z-axis, the X-axis, Y-axis, and the Z-axis being mutually orthogonal to one another.

3. The method of claim 1, wherein the coronal-most surface substantially surrounds a bore of the abutment and is planar, wherein the at least a portion of the conical surface has a constant radius of curvature along a plane perpendicular to the longitudinal axis, wherein, after matching, the first informational markers are locked in five of six degrees of freedom with a translational position of the first informational markers along the Z-axis being determined based on a height of the virtual abutment corresponding to the second informational marker, and further comprising:

merging the determined virtual abutment with the 3D virtual model whereby the coronal-most surface and the circumferential portion are fixed in five degrees of freedom and the first informational markers are locked translationally along the X-axis and Y-axis and locked rotationally along the X-axis, the Y-axis, and the Z-axis, the X-axis, the Y-axis, and the Z-axis being mutually orthogonal to one another;

based on the second information marker, the second informational marker indicating a height of the determined virtual abutment, determining a position of the seating surface of the determined virtual abutment relative to the seating surface between the abutment and the dental implant; and removing the determined virtual abutment from the 3D virtual model to form a modified 3D virtual model to define an opening in virtual tissue representing the patient's mouth and comprising the position and orientation of the seating surface of the determined virtual abutment, the modified 3D virtual model being used in the developing of the virtual dental component.

4. The method of claim 1, wherein, in the first predetermined angular relationship, the coronal-most surface is perpendicular to the longitudinal axis, wherein the coronal-most surface substantially surrounds a bore of the abutment and is perpendicular to the longitudinal axis of the abutment and wherein the matching comprises shape matching of the shape of the first informational markers to the shape of the determined virtual abutment, wherein the second informational marker is not provided in the scan data, and further comprising receiving the second informational marker separate from the scan data.

5. The method of claim 1, wherein the abutment comprises a healing abutment, healing element, healing cap, or scan body and wherein the coronal-most surface substantially surrounds a bore of the abutment, adjoins the circumferential portion, and includes an inner ridge and an outer ridge of the cutout, wherein the abutment comprises the second informational marker, the second informational marker indicating an identity of the determined virtual abutment and/or a characteristic of the abutment, the characteristic comprising one or more of dimensional information, profile and cross-sectional shape, and dental implant connection type, and wherein the shape matching is independent of a shape of the second informational marker.

6. The method of claim 1, wherein substantially the entire top surface extends between the coronal-most surface and the rounded peripheral edge and forms the at least a portion of the conical surface, wherein the abutment data includes the second informational marker that allows identification of a height of the abutment, wherein the shape matching is independent of a shape of the second informational marker, wherein only the first informational markers and not the second informational marker are used to determine the orientation of the longitudinal axis of the virtual dental implant and the Z-axis, and a rotational orientation of the mating non-rotational features of the virtual abutment and virtual dental implant in the 3D virtual model, and wherein the second informational marker allows identification of at least one of:

a shape of a profile of the abutment;
a connection type of the dental implant;
a cross-sectional shape of the abutment; and
a width of the abutment.

7. The method of claim 1, wherein the at least a portion of the conical surface has a constant radius of curvature along a plane perpendicular to the longitudinal axis, wherein the circumferential portion extends less than 360 degrees around the longitudinal axis and less than the entire length between the coronal-most surface and the rounded peripheral edge, wherein, after matching, the first informational markers are locked in five of six degrees of freedom with a translational position of the first informational markers along the Z-axis being determined based on a height of the virtual abutment and wherein determining the Z-axis location of the seating surface, orientation of the longitudinal axis of the virtual abutment, and the longitudinal axis of a virtual dental implant within the 3D virtual model includes:

merging the virtual abutment with the abutment data by shape matching the first informational markers with the virtual first informational markers of the determined virtual abutment to form a first modified 3D model.

8. The method of claim 7, wherein the truncation plane defines a frustrum of the at least a portion of the conical surface, further including:

forming a second modified 3D model by subtracting the virtual abutment from the first modified 3D model, wherein the second modified 3D model illustrates the Z-axis seating surface location and longitudinal axis orientation of of the virtual dental implant, the Z-axis seating surface location and longitudinal axis orientation of the virtual dental implant corresponding to the Z-axis location and longitudinal axis orientation of the dental implant installed within the patient's mouth.

9. A system for designing a virtual dental component, when executed by at least one processor, cause the at least one processor to perform operations to:

receive scan data including at least abutment data representing an abutment attached to a dental implant installed in a patient's mouth, the abutment data including first informational markers on a top surface of the abutment and a second information marker different from the first informational markers, the first informational markers including:

a coronal-most surface positioned exteriorly to a bore for a retention screw and comprising an inner edge spaced from an outer edge and having a first predetermined angular relationship to an orientation of a longitudinal axis of the abutment;

a circumferential portion between the outer edge of the coronal-most surface and a rounded peripheral edge defining a boundary between the top surface and a side surface of the abutment, wherein the circumferential portion has a constant taper along a portion of the top surface between the coronal-most surface and the rounded peripheral edge to form at least a portion of a conical surface having a central axis with a second predetermined angular relationship to the orientation of the longitudinal axis of the abutment, the first and second predetermined angular relationships being different wherein the at least a portion of the conical surface extends substantially around the longitudinal axis, and wherein the coronal-most surface is positioned in a truncation plane of the at least a portion of the conical surface; and a cutout in the circumferential portion defining a ridge extending between peripheral edges of the abutment;

create a three-dimensional (3D) virtual model of the scan data;

determine a virtual abutment in a library of different abutments that corresponds to the second informational marker, the virtual abutment including virtual first informational markers including a coronal-most surface, circumferential portion, and cutout having substantially the same shape as a corresponding first informational marker of the abutment;

shape match a shape of each of the coronal-most surface, circumferential portion, and cutout of the first informational markers of the abutment to a shape of the coronal-most surface, circumferential portion and cutout, respectively, of the virtual first informational markers on a corresponding virtual abutment to determine: based on the coronal-most surface and second information marker, a Z-axis location of a seating surface between the abutment and the dental implant; based on the second predetermined angular relationship of the central axis to the orientation of the longitudinal axis of the abutment, an orientation of the longitudinal axis of the virtual abutment, the orientation of the longitudinal axis of the abutment being the same as an orientation of the Z-axis, and a longitudinal axis of a virtual dental implant within the 3D virtual model; and, based on a position of the cutout, an orientation relative to X- and Y-axes of a mating non-rotational feature of the virtual abutment and virtual dental implant within the 3D virtual model, wherein the shape matching is independent of a shape of the second informational marker, wherein only the first informational markers and not the second informational marker are used to determine the orientation of the longitudinal axis of the virtual dental implant and the Z-axis, and a rotational orientation of the mating non-rotational features of the virtual abutment and virtual dental implant in the 3D virtual model; and develop the virtual dental component including dental component dimensional information based on the seating surface Z-axis location, Z-axis orientation, and X-Y axis orientation of the mating non-rotational features of the virtual abutment and virtual dental implant.

10. The system of claim 9, wherein the truncation plane defines a frustrum of the at least a portion of the conical surface, wherein, in the first predetermined angular relationship, the coronal-most surface is perpendicular to the longitudinal axis, wherein, in the second predetermined angular relationship, the central axis of the circumferential portion is aligned with the longitudinal axis of the abutment, wherein the at least a portion of the conical surface has a constant radius of curvature along a plane perpendicular to the longitudinal axis, wherein, after matching, the first informational markers are locked in five of six degrees of freedom with a translational position of the first informational markers along the Z-axis being determined based on a height of the virtual abutment corresponding to the second informational marker and wherein the processor:

merges the determined virtual abutment with the 3D virtual model whereby the coronal-most surface and the circumferential portion are fixed in five degrees of freedom and the first informational markers are locked translationally along the X-axis and Y-axis and locked rotationally along the X-axis, Y-axis, and the Z-axis, the X-axis, Y-axis, and the Z-axis being mutually orthogonal to one another.

11. The system of claim 9, wherein the circumferential portion extends less than 360 degrees around the longitudinal axis and less than the entire length between the coronal-most surface and the rounded peripheral edge, wherein the abutment comprises a healing abutment, healing element, healing cap, or scan body and wherein the coronal-most surface substantially surrounds a bore of the abutment and is planar, wherein the at least a portion of the conical surface has a constant radius of curvature along a plane perpendicular to the longitudinal axis, wherein, after matching, the first informational markers are locked in five of six degrees of freedom with a translational position of the first informational markers along the Z-axis being determined based on a height of the virtual abutment corresponding to the second informational marker, and wherein the processor:

merges the determined virtual abutment with the 3D virtual model whereby the coronal-most surface and the circumferential portion are fixed in five degrees of freedom and the first informational markers are locked translationally along the X-axis and Y-axis and locked rotationally along the X-axis, the Y-axis, and the Z-axis, the X-axis, the Y-axis, and the Z-axis being mutually orthogonal to one another;

based on the second information marker, the second informational marker indicates a height of the determined virtual abutment, determining a position of the seating surface of the determined virtual abutment relative to the seating surface between the abutment and the dental implant; and removes the determined virtual abutment from the 3D virtual model to form a modified 3D virtual model to define an opening in virtual tissue representing the patient's mouth and comprising the position and orientation of the seating surface of the determined virtual abutment, the modified 3D virtual model being used in developing a virtual dental component.

12. The system of claim 9, wherein substantially the entire top surface extends between the coronal-most surface and the rounded peripheral edge and forms the conical surface, wherein the coronal-most surface substantially surrounds a bore of the abutment and is perpendicular to the longitudinal axis of the abutment and wherein the matching comprises shape matching of the shape of the first informational markers to the shape of the determined virtual abutment, wherein the second informational marker is not provided in the scan data, and further comprising receiving the second informational marker separate from the scan data.

13. The system of claim 9, wherein the coronal-most surface substantially surrounds a bore of the abutment, adjoins the circumferential portion, and includes an inner ridge and an outer ridge of the cutout, wherein the abutment comprises the second informational marker, the second informational marker indicating an identity of the determined virtual abutment and/or a characteristic of the abutment, the characteristic comprising one or more of dimensional information, profile and cross-sectional shape, and dental implant connection type, and wherein the shape matching is independent of a shape of the second informational marker.

14. The system of claim 9, wherein the abutment data includes the second informational marker that allows identification of a height of the abutment, and wherein the second informational marker allows identification of at least one of:

a shape of a profile of the abutment;
a connection type of the dental implant;
a cross-sectional shape of the abutment; and
a width of the abutment.

15. The system of claim 9, wherein the at least a portion of the conical surface has a constant radius of curvature along a plane perpendicular to the longitudinal axis, wherein, after matching, the first informational markers are locked in five of six degrees of freedom with a translational position of the first informational markers along the Z-axis being determined based on a height of the virtual abutment and wherein in determining the Z-axis location and longitudinal axis orientation of the dental implant within the 3D virtual model the processor:

merges the virtual abutment with the abutment data by shape matching the first informational markers with the virtual first informational markers of the determined virtual abutment to form a first modified 3D model.

16. The system of claim 15, wherein the processor:

forms a second modified 3D model by subtracting the virtual abutment from the first modified 3D model, wherein the second modified 3D model illustrates the Z-axis location of the seating surface, orientation of the longitudinal axis of the virtual abutment, and the longitudinal axis of a virtual dental implant within the 3D virtual model, the Z-axis seating surface location and longitudinal axis orientation of the virtual dental implant corresponding to the Z-axis location and longitudinal axis orientation of the dental implant installed within the patient's mouth.

17. A method of designing a virtual dental component, the method comprising:

receiving scan data including at least abutment data representing a abutment attached to a dental implant installed in a patient's mouth, the abutment data including first informational markers on an upper surface of the abutment and a second informational marker, the first informational markers including:

a first reference surface positioned exteriorly to a bore for a retention screw, the first reference surface being substantially planar and having a first predetermined angular relationship to an orientation of a longitudinal axis of the abutment;

a second reference surface positioned exteriorly to the bore for the retention screw and extending substantially around the longitudinal axis, the second reference surface comprises a circumferential portion between an outer edge of the first reference surface and a rounded peripheral edge defining a boundary between a top surface and a side surface of the abutment, wherein the second reference surface has a constant taper along a portion of the top surface between the first reference surface and the rounded peripheral edge to form at least a portion of a conical surface and at least a portion of the second reference surface is not coplanar with the first reference surface and is symmetrically disposed relative to a central axis, the central axis having a second predetermined angular relationship to the orientation of the longitudinal axis of the abutment, the first and second predetermined angular relationships being different; and a third reference surface located between the second reference surface and a peripheral edge of the abutment and indicating an orientation of a non-rotational feature of the dental implant, the first, second, and third reference surfaces being different from one another;

creating a three-dimensional (3D) virtual model of the scan data;

determining a virtual abutment in a library of different abutments that corresponds to the second informational marker, the virtual abutment including virtual first informational markers including first, second, and third reference surfaces having substantially the same shape as a corresponding first informational marker of the abutment;

shape matching a shape of each of the first, second and third reference surfaces of the first informational markers of the abutment to a shape of the first, second, and third reference surfaces, respectively, of the virtual first informational markers on a corresponding virtual abutment to determine: based on the first reference surface and second information marker, a Z-axis location of a seating surface between the abutment and the dental implant; based on the second predetermined angular relationship of the central axis to the orientation of the longitudinal axis of the abutment, an orientation of the longitudinal axis of the virtual abutment, the orientation of the longitudinal axis of the abutment being the same as an orientation of the Z-axis and a longitudinal axis of a virtual dental implant within the 3D virtual model; and, based on an X-Y position of the third reference surface, an orientation relative to X- and Y-axes of the non-rotational feature of the virtual dental implant within the 3D virtual model, wherein only the first informational markers and not the second informational marker are used to determine the orientation of the longitudinal axis of the virtual dental implant and the Z-axis and a rotational orientation of the non-rotational feature of the virtual dental implant in the 3D virtual model; and developing the virtual dental component including dental component dimensional information based on the seating surface Z-axis location, Z-axis orientation, and X-Y axis orientation of the non-rotational feature of the virtual dental implant.

18. The method of claim 17, wherein the abutment comprises a healing abutment, healing element, healing cap, or scan body and wherein:

the first reference surface comprises a coronal-most surface positioned exteriorly to a bore for a retention screw and comprising an inner edge spaced from an outer edge, wherein the coronal-most surface substantially surrounds a bore of the abutment and is perpendicular to the longitudinal axis of the abutment; and the third reference surface comprises a cutout in the circumferential portion defining a ridge extending between edges of the abutment, wherein the coronal-most surface substantially surrounds a bore of the abutment, adjoins the circumferential portion, and includes an inner ridge and an outer ridge of the cutout.

19. The method of claim 18, wherein the at least a portion of the conical surface has a constant radius of curvature along a plane perpendicular to the longitudinal axis, wherein, after matching, the first informational markers are locked in five of six degrees of freedom with a translational position of the first informational markers along the Z-axis being determined based on a height of the virtual abutment corresponding to the second informational marker and further comprising:

merging the determined virtual abutment with the 3D virtual model whereby the coronal-most surface and the circumferential portion are fixed in five degrees of freedom and the first informational markers are locked translationally along the X-axis and Y-axis and locked rotationally along the X-axis, Y-axis, and the Z-axis, the X-axis, Y-axis, and the Z-axis being mutually orthogonal to one another.

20. The method of claim 18, wherein the coronal-most surface substantially surrounds a bore of the abutment and is planar, wherein the at least a portion of the conical surface has a constant radius of curvature along a plane perpendicular to the longitudinal axis, wherein, after matching, the first informational markers are locked in five of six degrees of freedom with a translational position of the first informational markers along the Z-axis being determined based on a height of the virtual abutment corresponding to the second informational marker, and further comprising:

merging the determined virtual abutment with the 3D virtual model whereby the coronal-most surface and the circumferential portion are fixed in five degrees of freedom and the first informational markers are locked translationally along the X-axis and Y-axis and locked rotationally along the X-axis, the Y-axis, and the Z-axis, the X-axis, the Y-axis, and the Z-axis being mutually orthogonal to one another;

based on the second information marker, the second informational marker indicating a height of the determined virtual abutment, determining a position of the seating surface of the determined virtual abutment relative to the seating surface between the abutment and the dental implant; and removing the determined virtual abutment from the 3D virtual model to form a modified 3D virtual model to define an opening in virtual tissue representing the patient's mouth and comprising the position and orientation of the seating surface of the determined virtual abutment, the modified 3D virtual model being used in the developing of the virtual dental component.

21. The method of claim 17, wherein the conical surface has an arcuate base and wherein the second reference surface extends less than 360 degrees around the longitudinal axis, and less than an entire length between the first reference surface and a rounded corner of the abutment.

22. A system for designing a virtual dental component, when executed by at least one processor, cause the at least one processor to perform operations to:

receive scan data including at least abutment data representing a abutment attached to a dental implant installed in a patient's mouth, the abutment data including first informational markers on an upper surface of the abutment and a second informational marker, the first informational markers including:

a first reference surface positioned exteriorly to a bore for a retention screw, the first reference surface being substantially planar and having a first predetermined angular relationship to an orientation of a longitudinal axis of the abutment;

a second reference surface positioned exteriorly to the bore for the retention screw and extending substantially around the longitudinal axis, the second reference surface comprises a circumferential portion between an outer edge of the first reference surface and a rounded peripheral edge defining a boundary between a top surface and a side surface of the abutment, wherein the second reference surface has a constant taper along a portion of the top surface between the first reference surface and the rounded peripheral edge to form at least a portion of a conical surface and at least a portion of the second reference surface is not coplanar with the first reference surface and is symmetrically disposed relative to a central axis, the central axis having a second predetermined angular relationship to the orientation of the longitudinal axis of the abutment, the first and second predetermined angular relationships being different; and a third reference surface located between the second reference surface and a peripheral edge of the abutment and indicating an orientation of a non-rotational feature of the dental implant, the first, second, and third reference surfaces being different from one another;

create a three-dimensional (3D) virtual model of the scan data;

determine a virtual abutment in a library of different abutments that corresponds to the second informational marker, the virtual abutment including virtual first informational markers including first, second, and third reference surfaces having substantially the same shape as a corresponding first informational marker of the abutment;

shape match a shape of each of the first, second and third reference surfaces of the first informational markers of the abutment to a shape of the first, second, and third reference surfaces, respectively, of the virtual first informational markers on a corresponding virtual abutment to determine: based on the first reference surface and second information marker, a Z-axis location of a seating surface between the abutment and the dental implant; based on the second predetermined angular relationship of the central axis to the orientation of the longitudinal axis of the abutment, an orientation of the longitudinal axis of the virtual abutment, the orientation of the longitudinal axis of the abutment being the same as an orientation of the Z-axis and a longitudinal axis of a virtual dental implant within the 3D virtual model; and, based on an X-Y position of the third reference surface, an orientation relative to X- and Y-axes of the non-rotational feature of the virtual dental implant within the 3D virtual model, wherein only the first informational markers and not the second informational marker are used to determine the orientation of the longitudinal axis of the virtual dental implant and the Z-axis and a rotational orientation of the non-rotational feature of the virtual dental implant in the 3D virtual model; and develop the virtual dental component including dental component dimensional information based on the seating surface Z-axis location, Z-axis orientation, and X-Y axis orientation of the non-rotational feature of the virtual dental implant.

23. The system of claim 22, wherein the abutment comprises a healing abutment, healing element, healing cap, or scan body and wherein:

the first reference surface comprises a coronal-most surface positioned exteriorly to a bore for a retention screw and comprising an inner edge spaced from an outer edge, wherein the coronal-most surface substantially surrounds a bore of the abutment and is perpendicular to the longitudinal axis of the abutment; and the third reference surface comprises a cutout in the circumferential portion defining a ridge extending between edges of the abutment, wherein the coronal-most surface substantially surrounds a bore of the abutment, adjoins the circumferential portion, and includes an inner ridge and an outer ridge of the cutout.

24. The system of claim 23, wherein the at least a portion of the conical surface has a constant radius of curvature along a plane perpendicular to the longitudinal axis, wherein, after matching, the first informational markers are locked in five of six degrees of freedom with a translational position of the first informational markers along the Z-axis being determined based on a height of the virtual abutment corresponding to the second informational marker and wherein the at least one processor performs a further operation to:
  merge the determined virtual abutment with the 3D virtual model whereby the coronal-most surface and the circumferential portion are fixed in five degrees of freedom and the first informational markers are locked translationally along the X-axis and Y-axis and locked rotationally along the X-axis, Y-axis, and the Z-axis, the X-axis, Y-axis, and the Z-axis being mutually orthogonal to one another.

25. The system of claim 23, wherein the coronal-most surface substantially surrounds a bore of the abutment and is planar, wherein the at least a portion of the conical surface has a constant radius of curvature along a plane perpendicular to the longitudinal axis, wherein, after matching, the first informational markers are locked in five of six degrees of freedom with a translational position of the first informational markers along the Z-axis being determined based on a height of the virtual abutment corresponding to the second informational marker, and wherein the at least one processor performs further operations to:
  merge the determined virtual abutment with the 3D virtual model whereby the coronal-most surface and the circumferential portion are fixed in five degrees of freedom and the first informational markers are locked translationally along the X-axis and Y-axis and locked rotationally along the X-axis, the Y-axis, and the Z-axis, the X-axis, the Y-axis, and the Z-axis being mutually orthogonal to one another;
  based on the second information marker, the second informational marker indicating a height of the determined virtual abutment, determine a position of the seating surface of the determined virtual abutment relative to the seating surface between the abutment and the dental implant; and
  remove the determined virtual abutment from the 3D virtual model to form a modified 3D virtual model to define an opening in virtual tissue representing the patient's mouth and comprising the position and orientation of the seating surface of the determined virtual abutment, the modified 3D virtual model being used in developing a virtual dental component.

26. The system of claim 22, wherein the conical surface has an arcuate base and wherein the second reference surface extends less than 360 degrees around the longitudinal axis, and less than an entire length between the first reference surface and a rounded corner of the abutment.

* * * * *